US010927250B2

(12) United States Patent
Grayson et al.

(10) Patent No.: US 10,927,250 B2
(45) Date of Patent: Feb. 23, 2021

(54) NANOPARTICLE POLYMER GRAFTED DISPERSANTS AND UNIMOLECULAR MICELLES AND METHODS OF USE

(71) Applicant: ADMINISTRATORS OF THE TULANE EDUCATIONAL FUND, New Orleans, LA (US)

(72) Inventors: Scott Grayson, New Orleans, LA (US); Alina Alb, New Orleans, LA (US); Muhammad Ejaz, New Orleans, LA (US)

(73) Assignee: ADMINISTRATORS OF THE TULANE EDUCATIONAL FUND, New Orleans, LA (US)

( * ) Notice: Subject to any disclaimer, the term of this patent is extended or adjusted under 35 U.S.C. 154(b) by 49 days.

(21) Appl. No.: 15/649,116

(22) PCT Filed: Jan. 26, 2016

(86) PCT No.: PCT/US2016/014929

§ 371 (c)(1),
(2) Date: Jul. 13, 2017

(87) PCT Pub. No.: WO2016/123107

PCT Pub. Date: Aug. 4, 2016

(65) Prior Publication Data

US 2018/0194938 A1 Jul. 12, 2018

Related U.S. Application Data

(60) Provisional application No. 62/108,944, filed on Jan. 28, 2015.

(51) Int. Cl.

| | |
|---|---|
| ***B32B 27/14*** | (2006.01) |
| ***B32B 7/04*** | (2019.01) |
| ***B32B 3/00*** | (2006.01) |
| ***C09C 3/10*** | (2006.01) |
| ***C08L 67/04*** | (2006.01) |
| ***C07F 7/08*** | (2006.01) |
| ***C08G 63/08*** | (2006.01) |
| ***C08G 65/34*** | (2006.01) |
| ***C08J 3/05*** | (2006.01) |
| ***C08K 3/26*** | (2006.01) |
| *G01N 23/2251* | (2018.01) |
| *G01N 21/35* | (2014.01) |

(52) U.S. Cl.

CPC ............ *C08L 67/04* (2013.01); *C07F 7/0838* (2013.01); *C08G 63/08* (2013.01); *C08G 65/34* (2013.01); *C08J 3/05* (2013.01); *C08K 3/26* (2013.01); *C07B 2200/11* (2013.01); *C08J 2467/04* (2013.01); *C08J 2471/08* (2013.01); *C08K 2003/265* (2013.01); *C08L 2205/18* (2013.01); *G01N 23/2251* (2013.01); *G01N 2021/3595* (2013.01)

(58) Field of Classification Search

CPC .......... C09C 3/08; C09C 3/10; C09C 1/3063; C09C 1/3072

See application file for complete search history.

(56) References Cited

U.S. PATENT DOCUMENTS

| | | | | |
|---|---|---|---|---|
| 6,362,274 | B1 * | 3/2002 | Legrand | C08F 290/04 524/612 |
| 2005/0048650 | A1 | 3/2005 | Ignatious | |
| 2005/0147681 | A1 | 7/2005 | Zhao | |
| 2007/0160561 | A1 * | 7/2007 | Ouali | C08F 293/00 424/70.16 |
| 2008/0276497 | A1 | 11/2008 | Chou et al. | |
| 2002/0202816 | | 8/2009 | Schlenoff | |
| 2010/0010137 | A1 * | 1/2010 | Jonschker | B82Y 30/00 524/403 |
| 2010/0270238 | A1 * | 10/2010 | Jang | C08K 9/06 210/638 |
| 2013/0337266 | A1 * | 12/2013 | Hashemzadeh | B82Y 30/00 428/407 |
| 2015/0086633 | A1 * | 3/2015 | Sakanishi | C09C 1/3676 424/489 |

FOREIGN PATENT DOCUMENTS

| | | | | |
|---|---|---|---|---|
| CN | 101982478 A | | 3/2011 | |
| WO | WO-2013161553 A1 | * | 10/2013 | C09C 1/3676 |

OTHER PUBLICATIONS (2007). Surface-active Agent. In Hawley's Condensed Chemical Dictionary, R. J. Lewis (Ed.). doi:10.1002/9780470114735.hawley15388 (Year: 2007).*

Muhammad Ejaz, Alina M. Alb, Scott M. Grayson. Amphiphilic hyperbranched polyglycerol-block-polycaprolactone copolymer-grafted nanoparticles with improved encapsulation properties (Year: 2016).*

Gilles Toussaint, Catherine Henrist, Christophe Detrembleur, Robert Jerome, and Rudi Cloots. Functionalized Nanoparticles for Composite Polymer Electrolyte. Mater. Res. Soc. Symp. Proc. vol. 1006. 2007. (Year: 2007).*

Hawley's Condensed Chemical Dictionary. Amphiphilic. 2007. (Year: 2007).*

Andrew T. Zill, Kai Licha, Rainer Haag and Steven C. Zimmerman. Synthesis and properties of fluorescent dyes conjugated to hyperbranched polyglycerols. NewJ. Chem., 2012, 36, 419-427. (Year: 2012).*

Mandi Abdollahi, Morteza Rouhani, Mahmoud Hemmatib and Parisa Salarizadeh. Grafting of water-soluble sulfonated monomers onto functionalized fumed silica nanoparticles via surface-initiated redox polymerization in aqueous medium. Polym Int 2013; 62: 713-720 (Year: 2013).*

* cited by examiner

*Primary Examiner* — Michael J Feely

(74) *Attorney, Agent, or Firm* — Fisherbroyles, LLP; Richard Echler

(57) ABSTRACT

Disclosed herein are amphiphilic surfactants which comprise a polymer chain having a hydrophobic unit and hydrophilic unit wherein the polymer is tethered to an inorganic nanoparticle. Further disclosed are methods for preparing the disclosed amphiphilic surfactants.

18 Claims, 9 Drawing Sheets

NANOPARTICLE POLYMER GRAFTED DISPERSANTS AND UNIMOLECULAR MICELLES AND METHODS OF USE

CROSS REFERENCE TO RELATED APPLICATIONS

This application claims priority to and the benefit of International Application Serial Number PCT/US16/14929, filed on Jan. 26, 2016, which claims priority to and the benefit of Provisional Application Ser. No. 62/108,944, filed on Jan. 28, 2015, the entire disclosure of which are incorporated herein by reference in its entirety.

FIELD OF THE INVENTION

Disclosed herein are amphiphilic surfactants which comprise a polymer chain having a hydrophobic unit and hydrophilic unit wherein the polymer is tethered to an inorganic nanoparticle. Further disclosed are methods for preparing the disclosed amphiphilic surfactants.

BRIEF DESCRIPTION OF THE FIGURES

FIG. 2A is a spectrum of the silica nanoparticles that are the starting material in Example 1. FIG. 2B is a spectrum of the nanoparticles having an anchoring group attached thereto as described in Example 1. FIG. 2C is a spectrum of the product of Example 2 wherein a polycaprolactone hydrophobic unit is attached to the anchoring unit. FIG. 2D is a spectrum of pure caprolactone.

FIG. 3A is a TGA of the silica nanoparticles that are the starting material in Example 1. FIG. 3B is a TGA of the nanoparticles having an anchoring group attached thereto as described in Example 1. FIG. 3C is a TGA of the product of Example 2 wherein a polycaprolactone hydrophobic unit is attached to the anchoring unit. FIG. 3D is a TGA of pure caprolactone.

FIG. 4A is a spectrum of the product of Example 2 wherein a polycaprolactone hydrophobic unit is attached to the anchoring unit. FIG. 4B is a spectrum of the amphiphilic surfactant prepared in Example 5. FIG. 4C is a spectrum of the MPEG starting material of Example 4.

FIG. 5A is a spectrum of the starting material of Example 3 wherein a polycaprolactone hydrophobic unit is attached to the anchoring unit. FIG. 5B is a spectrum of the amphiphilic surfactant prepared in Example 3. FIG. 5C is a spectrum of hyperbranched poly(glycerol) byproduct isolated from Example 3.

FIG. 6A is a spectrum of the starting material used in Examples 3 and 5 wherein a polycaprolactone hydrophobic unit is present. FIG. 6B is a spectrum of the product of Example 5. FIG. 6C is a spectrum of the product of Example 3.

FIG. 7A is a TGA of the product of Example 2 wherein a polycaprolactone hydrophobic unit is attached to the anchoring unit. FIG. 7B is a TGA of the product of Example 5. FIG. 7C is a TGA of the product of Example 3. FIG. 7D is a TGA of the MPEG starting material of Example 4. FIG. 7F is a TGA of hyperbranched poly(glycerol) byproduct isolated from Example 3.

FIG. 8A top graph depicts the intensity-averaged $D_h$ values from multiple dynamic light scattering measurements made on solution comprising the surfactant obtained from Example 3 (■) and Example 5 (♦). FIG. 8B top graph depicts the intensity-averaged $D_h$ values from multiple dynamic light scattering measurements made on solution comprising the surfactant obtained from Example 3 (■) and Example 5 (♦) after treatment with 4-heptylphenol.

symbol, □, 5 mol % GPS:95 mol % OTS; symbol, ○, 9.8 mol % GPS:90.2 mol % OTS; symbol, ●, 14.6 mol % GPS:85.4 mol % OTS; symbol, ♦, 20.4 mol % GPS:79.6 mol % OTS.

Figure 13:
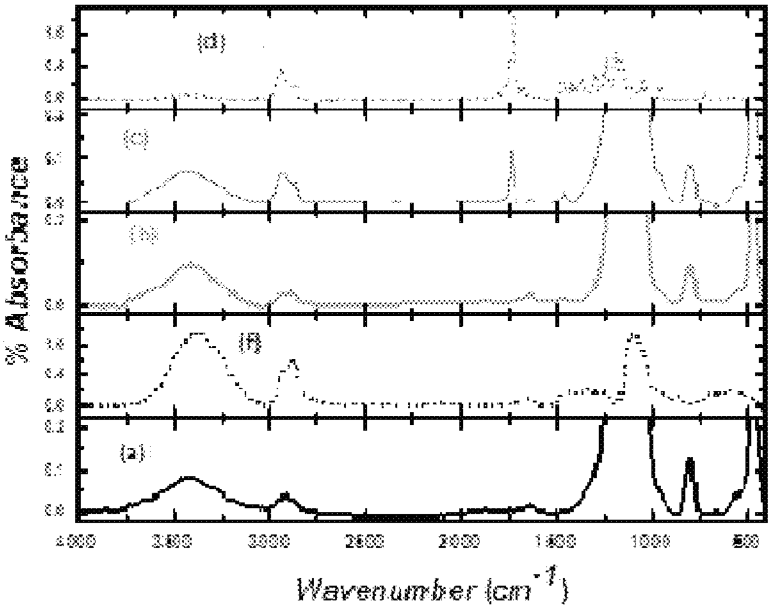

FIG. 13 represents the infrared spectra of the various products represented in Schemes V and VI. Starting from the top spectrum (d) is pure poly(caprolactone), spectrum (c) is the FTIR of the product of Scheme VI, spectrum (b) is the FTIR of the product of Scheme V, spectrum (0 is pure hyperbranched poly(glycidol) and spectrum (a) is the FTIR of the starting silica nanoparticles.

Figure 14:
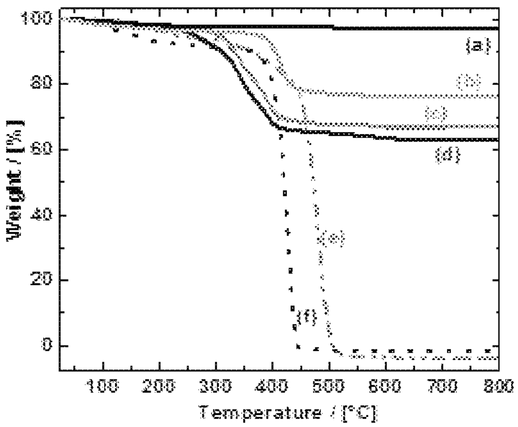

FIG. 14 represents the TGA curves of the various products represented in Schemes V, VI and VII as follows: curve (a) is the TGA of the silica nanoparticle starting material, curve (b) is the TGA of the product of Scheme V, curve (c) is the TGA of the product of Scheme VI, curve (d) is the TGA of the product of Scheme VII, curve (e) is pure poly(caprolactone) and curve (f) is pure hyperbranched poly(glycidol).

Figure 15:
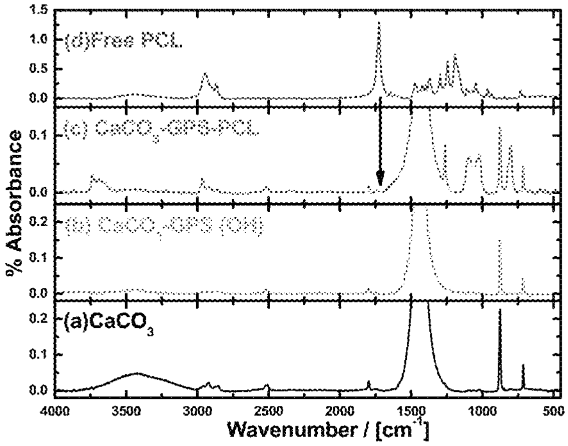

FIGS. 15A to 15D depict the products and the reactants of Examples 11 and 12. FIG. 15C is the FTIR spectrum of the isolated product of Example 12 which depicts a new absorption band at 1734 $cm^{-1}$ (attributed to the C═O stretching of the ester) and a weaker absorption at 2935 $cm^{-1}$ (consistent with the C—H stretching) in contrast to the starting material obtained in Example 11 and which FTIR is depicted in FIG. 15B. FIG. 15A is the FTIR of $CaCO_3$ nanoparticles and FIG. 15D is an FTIR of poly(caprolatone).

Figure 16:
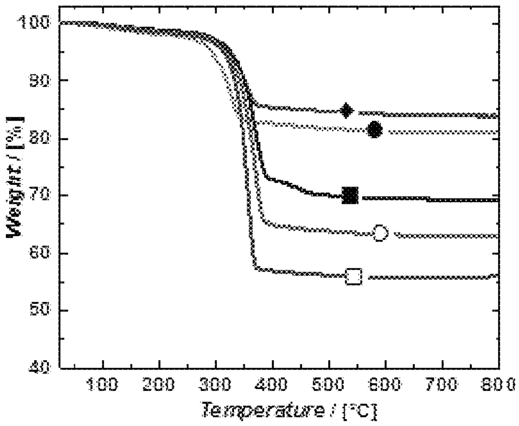

FIG. 16 depicts the variation in TGA for dispersants undergoing varying cycles of poly(caprolactone) grafting. The TGA curve indicated with, ♦, has one grafted poly (caprolactone) hydrophobic units (g=1); the TGA curve indicated with, ●, has two grafted poly(caprolactone) hydrophobic units (g=2); the TGA curve indicated with, ■, has three grafted poly(caprolactone) hydrophobic units (g=3); the TGA curve indicated with, ○, has four grafted poly(caprolactone) hydrophobic units (g=4); and the TGA curve indicated with, □, has is the TGA of poly(caprolactone).

Figure 17:
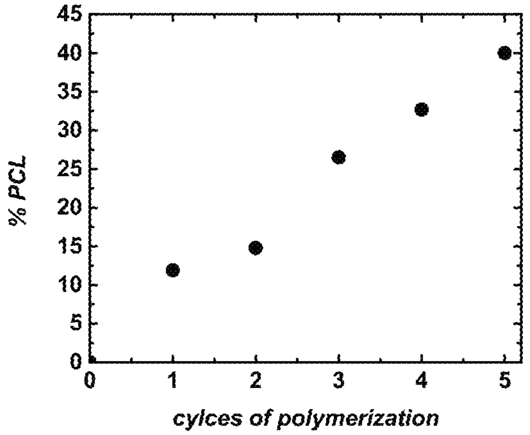

FIG. 17 shows the relationship between the number of polymerization grafting cycles and the amount of poly (caprolactone) hydrophobic units that are present in the resulting dispersant.

Figure 18:
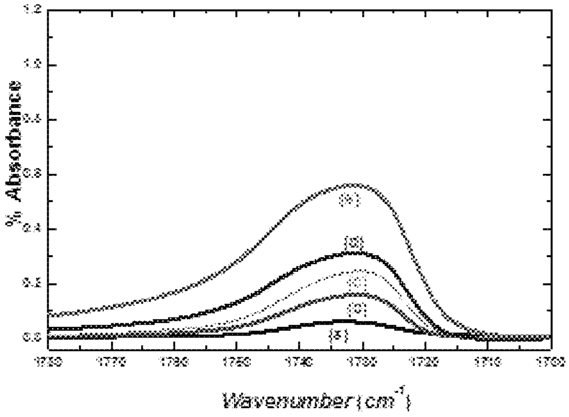

FIG. 18 is a section of the FTIR depicting the C═O stretching region for a series of dispersants wherein the poly(caprolactone) hydrophobic region is iteratively formed wherein all curves depict dispersants comprising a 3-glycidoxypropyl)triethoxysilane anchoring unit, poly(caprolactone) hydrophobic unit and a modified MPEG hydrophilic unit. Curve (a) one graft of poly(caprolactone), curve (b) a second graft, curve (c) a third graft, curve (d) a fourth graft and curve (e) a fifth graft.

DETAILED DESCRIPTION

The materials, compounds, compositions, articles, and methods described herein may be understood more readily by reference to the following detailed description of specific aspects of the disclosed subject matter and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

General Definitions

In this specification and in the claims that follow, reference will be made to a number of terms, which shall be defined to have the following meanings:

All percentages, ratios and proportions herein are by weight, unless otherwise specified. All temperatures are in degrees Celsius (° C.) unless otherwise specified.

The terms “a” and “an” are defined as one or more unless this disclosure explicitly requires otherwise.

Ranges may be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

Values for variables are expressed in ranges, for example, from 1 to about 500. This range includes all values from 1 to 500.

Certain reagents utilized in the formation of the disclosed surfactants are defined as having an average molecular weight, for example, poly(ethyleneglycol) methyl ether 500 (MPEG 500). The artisan will understand that materials such as MPEG 500 are described as having “an average molecular weight $M_n$ of 500” which is understood to include an admixture of molecules having a molecular weight in the range 470-530.

“Optional” or “optionally” means that the subsequently described event or circumstance can or cannot occur, and that the description includes instances where the event or circumstance occurs and instances where it does not.

The terms “comprise” (and any form of comprise, such as “comprises” and “comprising”), “have” (and any form of have, such as “has” and “having”), “include” (and any form of include, such as “includes” and “including”) and “contain” (and any form of contain, such as “contains” and “containing”) are open-ended linking verbs. As a result, an apparatus that “comprises,” “has,” “includes” or “contains” one or more elements possesses those one or more elements, but is not limited to possessing only those elements. Likewise, a method that “comprises,” “has,” “includes” or “contains” one or more steps possesses those one or more steps, but is not limited to possessing only those one or more steps.

Any embodiment of any of the compounds and methods can consist of or consist essentially of—rather than comprise/include/contain/have—any of the described steps, elements, and/or features. Thus, in any of the claims, the term “consisting of” or “consisting essentially of” can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

The terms “amphiphilic surfactant” and “dispersant” are used interchangeably in the present disclosure. Both terms can be equally applied to the disclosed compounds, compositions and methods.

Disclosed herein are dispersants or otherwise referred to herein as amphiphilic surfactants or nanoparticle polymer grafted dispersants or unimolecular micelles which act as surfactants or dispersants without regard to critical micelle concentration. The disclosed compounds, comprise:

i) a nanoparticle core; and ii) a plurality of polymeric units comprising a) one or more anchoring units;

b) one or more hydrophobic units;

c) one or more a hydrophilic units; and d) a capping unit which is a separate moiety or the terminal moiety of a hydrophobic or hydrophilic unit.

In one aspect disclosed herein are self-contained, unimolecular micelles which can act as amphiphilic surfactants independent of concentration. As such, disclosed herein are amphiphilic nanoparticles, comprising:

i) a nanoparticle core; and ii) a plurality of polymeric units bonded thereto having the formula:

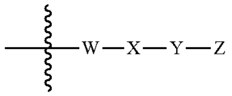

wherein W is an anchoring unit;

X is a hydrophobic unit;

Y is a hydrophilic unit; and

Z is a capping group.

The nanoparticle dispersants of this aspect can be graphically represented as:

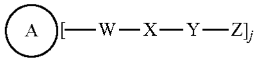

wherein A is an inorganic nanoparticle, W, X, Y and Z are the same as above and the index j indicates the average number of polymeric units bonded to the nanoparticle core. The index j can be from about 10 to about 10,000. The value of the index j, which is an average, can be determined in any manner determined by the formulator. For example, by the number of moles of a reagent, typically the anchoring unit, which reacts with the nanoparticle core. Another non-limiting means for determining the value of j is the increase in mass of the aggregate particles. Other means, such as light scattering, can be employed.

Another aspect of the disclosed amphiphilic nanoparticles, comprise:

i) a nanoparticle core; and ii) a plurality of polymeric units bonded thereto having the formula:

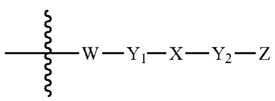

wherein W is an anchoring unit;

X is a hydrophobic unit;

$Y_1$ is a first hydrophilic unit;

$Y_2$ is a second hydrophilic unit; and

Z is a capping group.

The nanoparticle dispersants of this aspect can be graphically represented as:

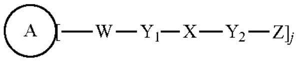

wherein A is an inorganic nanoparticle, W, X, $Y_1$, $Y_2$ and Z are the same as above and the index j indicates the average number of polymeric units bonded to the nanoparticle core. The index j can be from about 10 to about 10,000. The value of the index j, which is an average, can be determined in any manner determined by the formulator. For example, by the number of moles of a reagent, typically the anchoring unit, which reacts with the nanoparticle core. Another non-limiting means for determining the value of j is the increase in mass of the aggregate particles. This aspect of the disclosed surfactant can have Y units that are the same or the Y units can comprise two different polymeric materials.

A yet another aspect of the disclosed amphiphilic nanoparticles, comprise:

i) a nanoparticle core; and ii) a plurality of polymeric units bonded thereto having the formula:

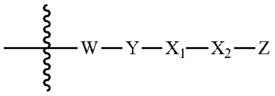

wherein W is an anchoring unit;

$X_1$ is a first hydrophobic unit;

$X_2$ is a second hydrophobic unit;

Y is a hydrophilic unit; and

Z is a capping group.

The nanoparticle dispersants of this aspect can be graphically represented as:

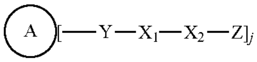

wherein A is an inorganic nanoparticle, $X_1$, $X_2$, Y and Z are the same as above and the index j indicates the average number of polymeric units bonded to the nanoparticle core. The index j can be from about 10 to about 10,000. The value of the index j, which is an average, can be determined in any manner determined by the formulator. For example, by the number of moles of a reagent, typically the anchoring unit, which reacts with the nanoparticle core. Another non-limiting means for determining the value of j is the increase in mass of the aggregate particles. This aspect of the disclosed surfactant can have $X_1$ units that are the same or different than the $X_2$ units.

A yet further aspect of the disclosed amphiphilic nanoparticles, comprise:

i) a nanoparticle core; and ii) a plurality of polymeric units bonded thereto having the formula:

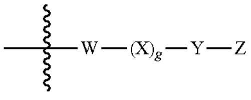

wherein X is a hydrophobic unit;

$Y_1$ is a first hydrophilic unit;

$Y_2$ is a second hydrophilic unit; and

Z is a capping group;

wherein the number of hydrophilic units is tunable. The index g is from 2 to about 10.

The nanoparticle dispersants of this aspect can be graphically represented as:

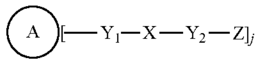

wherein A is an inorganic nanoparticle, W, X, Y and Z are the same as above and the index j indicates the average number of polymeric units bonded to the nanoparticle core. The index j can be from about 10 to about 10,000. The value of the index j, which is an average, can be determined in any manner determined by the formulator.

Nanoparticles

The nanoparticle can comprise any inorganic element or compound that is compatible with the polymeric side chains. Non-limiting examples of nanoparticles are chosen from is selected from the group comprising silica nanoparticles, functionalized silica nanoparticles, carbon hard spheres, barium titanate nanoparticles, calcium carbonate nanoparticles, lactose microparticles, porous silica nanoparticles, gold nanoparticles, silver nanoparticles, iron nanoparticles, silicon nanoparticles, aluminium oxide nanoparticles, or graphene nanopowder.

In one aspect of the disclosed amphiphilic surfactants the nanoparticle is chosen from silica, barium titanate, barium zirconium titanate-barium calcium titanate, carbon hard spheres, lactose monohydrate, or calcium carbonate. In another aspect the nanoparticle comprises silica ($SiO_2$). In another aspect the nanoparticle comprises calcium carbonate ($CaCO_3$).

The nanoparticles which comprise the disclosed amphiphilic surfactants can have an average diameter of from about 10 nanometers (nm) to about 250 nm. In one aspect the nanoparticles have a diameter of from about 50 nm to about 200 nm. In another aspect the nanoparticles have a diameter of from about 50 nm to about 150. In a further aspect the nanoparticles have a diameter of from about 70 nm to about 125. In a still further aspect the nanoparticles have a diameter of from about 70 nm to about 100. In yet another aspect the nanoparticles have a diameter of from about 75 nm to about 150. In still yet another aspect the nanoparticles have a diameter of from about 100 nm to about 150. In a yet still further aspect the nanoparticles have a diameter of from about 80 nm to about 120. The disclosed amphiphilic surfactants can have a nanoparticle core having a diameter of 10 nm, 11 nm, 12 m, 13 nm, 14 nm, 15 nm, 16 nm, 17 nm, 18 nm, 19 nm, 20 nm, 21 nm, 22 m, 23 nm, 24 nm, 25 nm, 26 nm, 27 nm, 28 nm, 29 nm, 30 nm, 31 nm, 32 m, 33 nm, 34 nm, 35 nm, 36 nm, 37 nm, 38 nm, 39 nm, 40 nm, 41 nm, 42 m, 43 nm, 44 nm, 45 nm, 46 nm, 47 nm, 48 nm, 49 nm, 50 nm, 51 nm, 52 m, 53 nm, 54 nm, 55 nm, 56 nm, 57 nm, 58 nm, 59 nm, 60 nm, 61 nm, 62 m, 63 nm, 64 nm, 65 nm, 66 nm, 67 nm, 68 nm, 69 nm, 70 nm, 71 nm, 72 m, 73 nm, 74 nm, 75 nm, 76 nm, 77 nm, 78 nm, 79 nm, 80 nm, 81 nm, 82 m, 83 nm, 84 nm, 85 nm, 86 nm, 87 nm, 88 nm, 89 nm, 90 nm, 91 nm, 92 m, 93 nm, 94 nm, 95 nm, 96 nm, 97 nm, 98 nm, 99 nm, 100 nm, 1010 nm, 102 m, 103 nm, 104 nm, 105 nm, 106 nm, 107 nm, 108 nm, 109 nm, 110 nm, 111 nm, 112 m, 113 nm, 114 nm, 115 nm, 116 nm, 117 nm, 118 nm, 119 nm, 120 nm, 121 nm, 122 m, 123 nm, 124 nm, 125 nm, 126 nm, 127 nm, 128 nm, 129 nm, 130 nm, 131 nm, 132 m, 133 nm, 134 nm, 135 nm, 136 nm, 137 nm, 138 nm, 139 nm, 140 nm, 141 nm, 142 m, 143 nm, 144 nm, 145 nm, 146 nm, 147 nm, 148 nm, 149 nm, 150 nm, 151 nm, 152 m, 153 nm, 154 nm, 155 nm, 156 nm, 157 nm, 158 nm, 159 nm, 160 nm, 161 nm, 162 m, 163 nm, 164 nm, 165 nm, 166 nm, 167 nm, 168 nm, 169 nm, 170 nm, 171 nm, 172 m, 173 nm, 174 nm, 175 nm, 176 nm, 177 nm, 178 nm, 179 nm, 180 nm, 181 nm, 182 m, 183 nm, 184 nm, 185 nm, 186 nm, 187 nm, 188 nm, 189 nm, 190 nm, 191 nm, 192 m, 193 nm, 194 nm, 195 nm, 196 nm, 197 nm, 198 nm, 199 nm or 200 nm.

The disclosed nanoparticles can be rigid or friable. The disclosed nanoparticles can be spherical or ovoid. If the nanoparticles comprises a plurality of elements or compounds, the nanoparticles can have the plurality of elements or compounds dispersed homogeneously or non-homogeneously.

Anchoring Units, W

The first element of the polymeric side chain is an anchoring unit. The anchoring unit serves to as a means for allowing grafting of the hydrophobic unit to the nanoparticle core. Therefore, the anchoring unit connects the nanoparticle core with the hydrophobic unit. Any unit which is capable of selectively reacting to the nanoparticle core and then subsequently reacting with the monomers which form the grafted hydrophobic unit can be used for preparing the disclosed amphiphilic surfactants. The anchoring unit can comprise a plurality of moieties which can react with the nanoparticle core. The anchoring unit can comprise a plurality of moieties onto which the hydrophobic unit can be grafted. Alternatively, the anchoring unit can comprise a plurality of different moieties that can react with both the nanoparticle and serve as a site for grafting of the hydrophobic unit.

In one aspect (3-glycidoxypropyl)triethoxysilane is the anchoring unit. Without wishing to be limited by theory, this unit can attach to the nanoparticle by way of 1-3 bonds, for example:

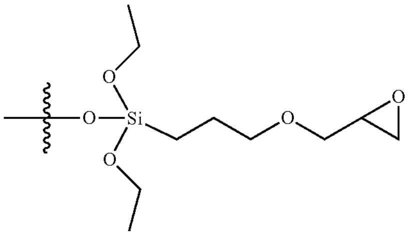

or

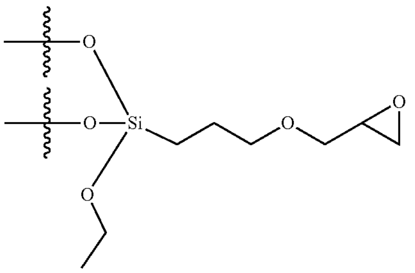

or

-continued

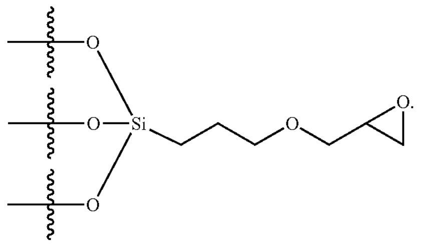

In another aspect, n-octyl triethoxysilane is the anchoring unit.

The number of full polymeric units which comprise the disclosed surfactants can be controlled by modifying the surface of the nanoparticle by including anchoring units which cannot be further modified by grafting. With this means, the number of full polymeric unit can be controlled. As a first step, the following illustrates the use of graftable and non-graftable anchoring units to control the properties of the surfactant. In the example below, ungraftable n-octyl triethoxysilane and (3-glycidoxypropyl)triethoxysilane are both reacted with the surface of the nanoparticle. Because only the (3-glycidoxypropyl)triethoxysilane can be further reacted to form a polymer chain, the density of the final micellular polymer units are controlled.

As such, the disclosed amphiphilic surfactants can comprise from about 1.25% to about 100% of graftable units such as (3-glycidoxypropyl)triethoxysilane. As such, the disclosed amphiphilic surfactants can comprise about 1.25%, about 2.5%, about 5%, about 10%, about 20%, about 30%, about 40%, about 50%, about 60%, about 70%, about 80%, about 90%, about 95%, about 97.5%, about 98.75 and 100% of one or more graftable anchoring units.

Conversely the disclosed amphiphilic surfactants can comprise from about 0% to about 98.75% of one or more non-graftable units such as n-octyl triethoxysilane. For example, about 1.25%, 2.5%, about 5%, about 10%%, about 20%, about 30%, about 40%, about 50%, about 60%, about 70%, about 80%, about 90%, about 95%, about 97.5%, and about 98.75 of a non-graftable anchoring units.

In a further aspect, glycidol can be used as the anchoring unit, especially for dispersants having the formulae:

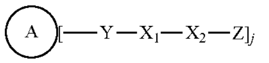 or

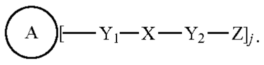.

In one embodiment, $Y_1$ and $Y_2$ represent a hydrophilic unit comprising the same monomers, for example, poly(glycidol). In another embodiment, $Y_1$ and $Y_2$ represent hydrophilic units comprising the different monomers, for example, poly(glycidol) and poly(ethylene glycol).

As indicated above, the anchoring units can be a combination of graftable and nono-graftable units. The formula below provides an example of a nanoparticle comprising a surface comprising both graftable and non-graftable anchoring units.

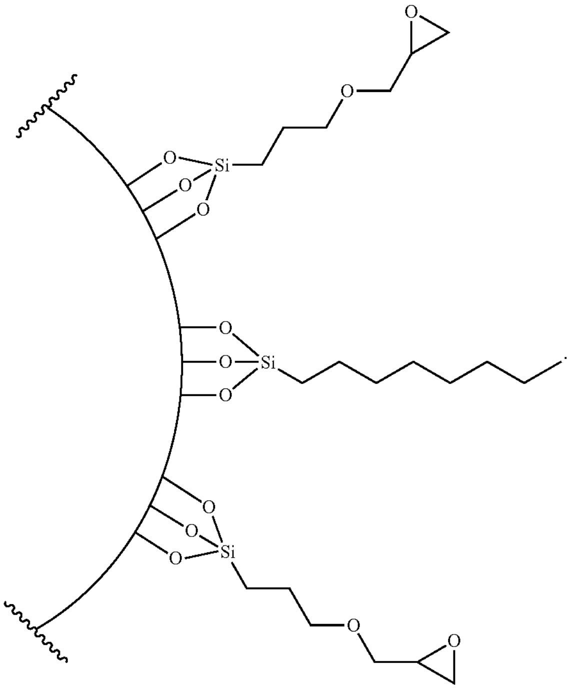

Hydrophobic Units, X

The disclosed unimolecular micellular amphiphilic surfactants comprise a hydrophobic unit, X, which links the anchoring unit W and the hydrophilic unit, Y. Without wishing to be limited by theory, the hydrophobic unit serves to absorb, entrap, entrain or otherwise take up molecules which have hydrophobic properties. Non-limiting examples of molecules having hydrophobic properties includes, $C_6$ and above hydrocarbons, mono-, di- and triglycerides, natural oils, resins, hydrocarbon residues from petroleum cracking or refining, and the like. In addition, because the hydrophobic units are linked to a hydrophilic unit, molecules such as long chain fatty acid having a hydrophobic and hydrophilic end can align themselves such that one end partitions into the disclosed surfactant's hydrophobic zone and the other end into the hydrophilic zone.

The hydrophobic unit is assembled by grafting suitable monomers onto the reactive end of the anchoring units. This process is further described and exemplified by the enumerated examples herein.

Non-limiting examples of monomers which can comprise the hydrophobic units include valerolactone, valerolactam, caprolactone, caprolactam, lactide, butyrolactone, and the like. As such, the disclosed hydrophobic unit can comprises poly(valerolactone), poly(caprolactone), poly(valeorlactam), poly(caprolactam), poly(lactide), poly-(butyrolactone), poly(lactic-co-glycolic acid) and the like.

In one aspect of the disclosed amphiphilic surfactants, the polymer units can comprise valerolactone units, for example, a polymer having the formula:

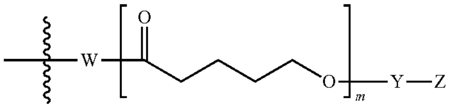

wherein the index m is from 1 to about 50. The following is a non-limiting example of valerolactone monomers grafted to an anchoring unit:

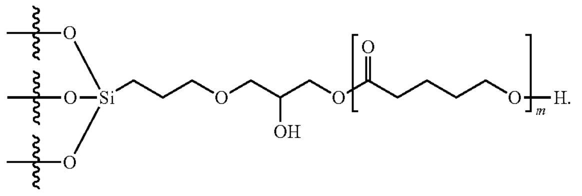

In another aspect of the disclosed amphiphilic surfactants, the polymer units can comprise caprolactone units, for example, a polymer having the formula:

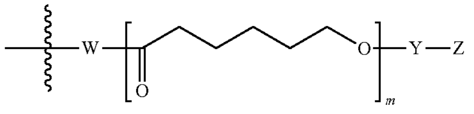

wherein the index m is from 1 to about 50. The following is a non-limiting example of caprolactone monomers grafted to an anchoring unit:

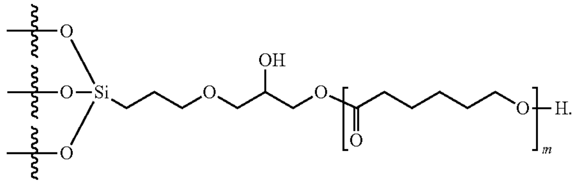

In a further aspect of the disclosed amphiphilic surfactants, the polymer units can comprise valerolactam units, for example, a polymer having the formula:

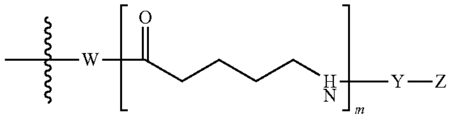

wherein the index m is from 1 to about 50. The following is a non-limiting example of valerolactone monomers grafted to an anchoring unit:

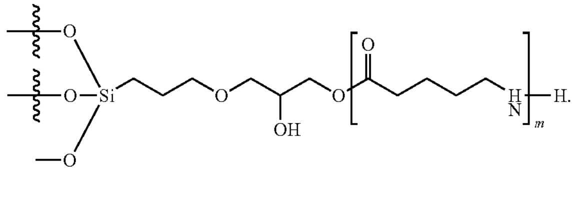

In a yet further aspect of the disclosed amphiphilic surfactants, the polymer units can comprise caprolactone units, for example, a polymer having the formula:

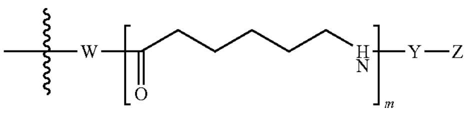

wherein the index m is from 1 to about 50. The following is a non-limiting example of caprolactone monomers grafted to an anchoring unit:

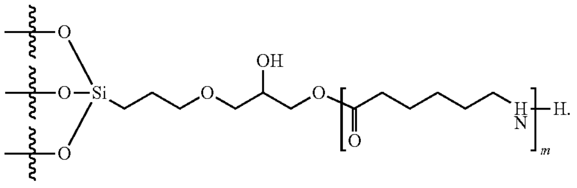

Utilizing step by step graph polymerization, the length of the hydrophilic unit can be closely tuned. The disclosed amphiphilic surfactants can comprise, for example, 19% by weight, 30% by weight, 37% by weight, 57% by weight of polycaprolactone. The relative amount of the polycaprolactone can be conveniently obtained by thermal gravimetric analysis.

Hydrophilic Units, Y

The disclosed unimolecular micellular amphiphilic surfactants comprise a hydrophilic unit, Y, which links the hydrophobic unit X and the capping group, Z. In one aspect of the disclosed amphiphilic surfactants the capping group Z can simply be defined as the last atom or moiety on the hydrophilic unit. For example, a surfactant comprising MPEG 500 as the hydrophilic unit will be terminated by a methyl group and this methyl group will be the Z unit for this example.

A first aspect of the disclosed hydrophilic units relates to units that, in a manner similar to the hydrophobic units, is formed by grafting onto the end of the hydrophobic unit. In one embodiment, for example, a unit having the formula:

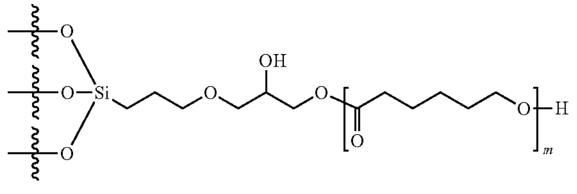

can be reacted with ethylene oxide to prepare —W—X—Y— units having the general formula:

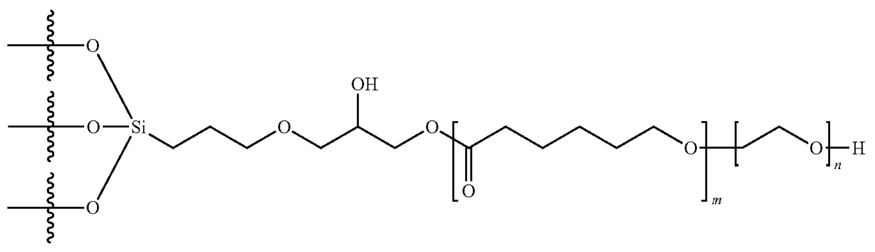

wherein the index m is from 1 to about 50 and the index n is from 1 to about 250. Polymers prepared in this manner afford the formulator the opportunity to control the final molecular weight or length of the hydrophilic unit by the rate in which ethylene oxide is introduced into the reaction vessel.

Another aspect relates to poly(ethylene glycol) methyl ether hydrophilic units which can have from 5 to 250 ethyleneoxy units, for example, the index n can be from 5 to about 250. In one embodiment, as depicted herein below in Examples 4 and 5, a commercially available poly(ethylene glycol) methyl ether (MPEG) can be modified to be capable of reacting with the terminal hydroxide of the hydrophobic unit. Non-limiting examples of commercially available poly (ethylene glycol) methyl ethers include MPEG 350, MPEG 500, MPEG 550, MPEG 750, MPEG 2,000 and MPEG 5,000 all of which are available from Sigma-Aldrich. In addition, MPEG 300, MPEG 400, MPEG 600, MPEG 1,000, MPEG 1,400, MPEG 3350 and MPEG 4,000 are available from Dow Chemical Company. Also, the formulator can prepare poly(ethylene glycol) methyl ethers by any of the methods well known in the art.

Depending upon the length of the desired polymer chain and the size of the nanoparticle, the distance between the hydrophilic ends of the polymer will increase proportionately as depicted in the image below:

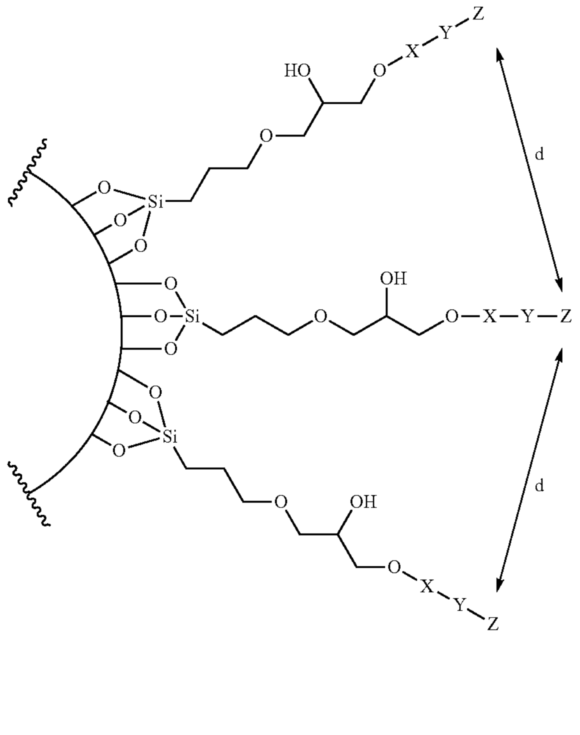

wherein d represents a distance between terminal Z units. Therefore, depending upon the properties which the formulator choses for the disclosed dispersants, the area between the hydrophilic ends can be reduced. One manner for decreasing this distance is to utilize highly branched hydrophilic units.

One aspect of the disclosed hydrophilic units relates to highly branched hydrophilic units comprising polyglycerol units having the formula:

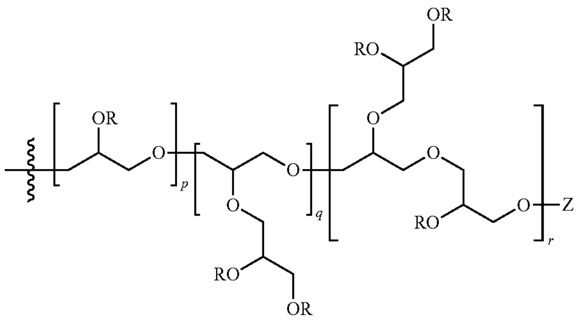

wherein the capping group Z is hydrogen;

each R is independently:

i) hydrogen;

ii) $—CH_2CHOHCH_2OH$; or iii) $—CH_2CHOR^1CH_2OR^1$;

each $R^1$ is independently:

i) hydrogen; or ii) $—CH_2CHOHCH_2OH$;

the index p is from 1 to 5, the index q is from 0 to 5 and the index r is from 0 to 5.

One embodiment of this aspect has the formula:

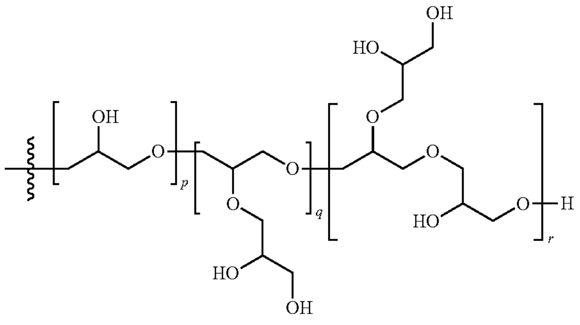

wherein the index p is from 1 to 5, the index q is from 1 to 5 and the index r is from 1 to 5. A non-limiting example of this embodiment has the formula:

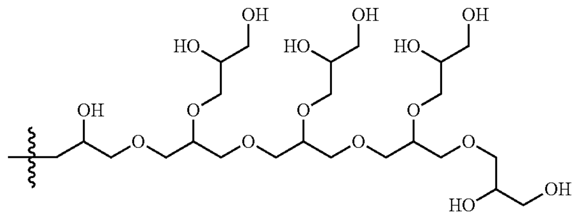 [SMILES: *CC(O)COCC(COCC(COCC(COCC(O)CO)OCC(O)CO)OCC(O)CO)OCC(O)CO]

Another embodiment of this aspect has the formula:

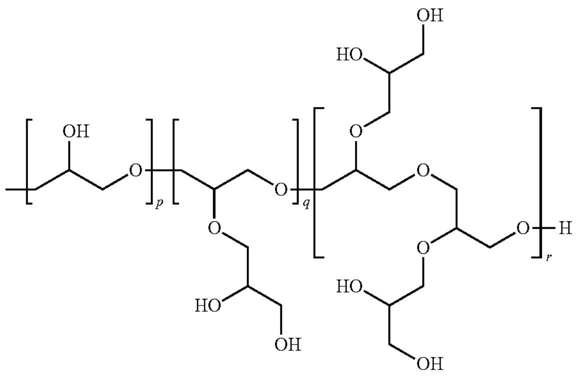

wherein the index p is from 1 to 5, the index q is from 1 to 5 and the index r is from 1 to 5.

A further embodiment of this aspect has the formula:

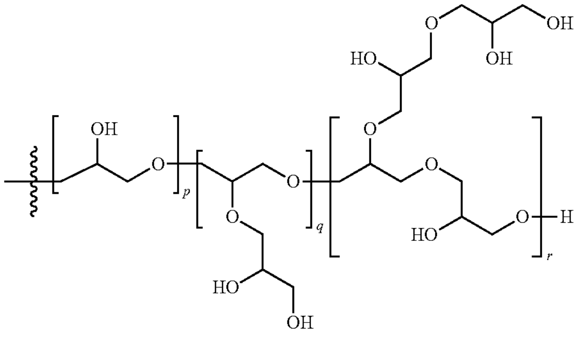

wherein the index p is from 1 to 5, the index q is from 1 to 5 and the index r is from 1 to 5.

A yet further embodiment of this aspect has the formula:

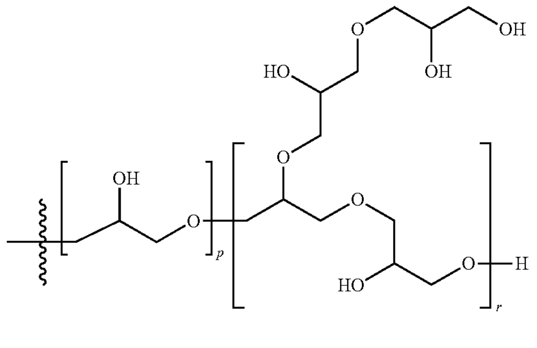

wherein the index p is from 1 to 5 and the index r is from 1 to 5.

A non-limiting example of this embodiment has the formula:

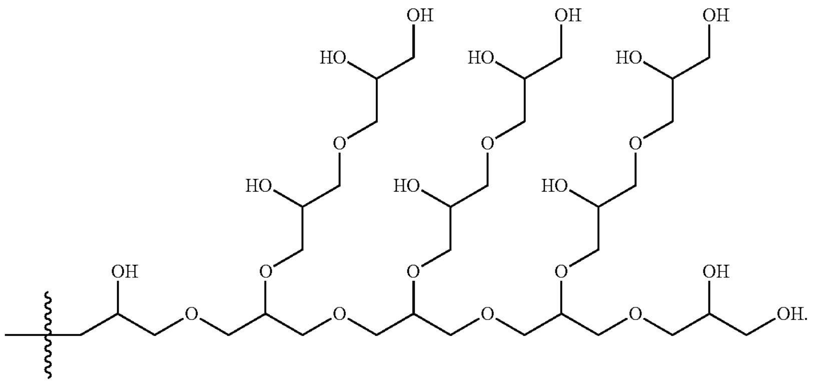 [SMILES: *CC(O)COCC(COCC(COCC(COCC(O)CO)OCC(O)COCC(O)CO)OCC(O)COCC(O)CO)OCC(O)COCC(O)CO]

One aspect of polymers comprising a highly branched hydrophobic unit relates to poly(δ-valerolactone)-glycidol block co-polymers having the formula:

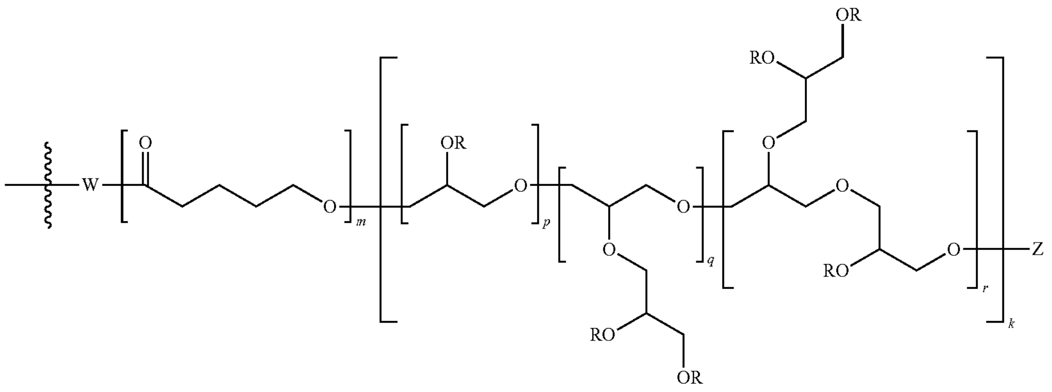

the index k is from 1 to 5.

Another aspect of polymers comprising a highly branched hydrophobic unit relates to poly(ε-caprolactone)-glycidol block co-polymers having the formula:

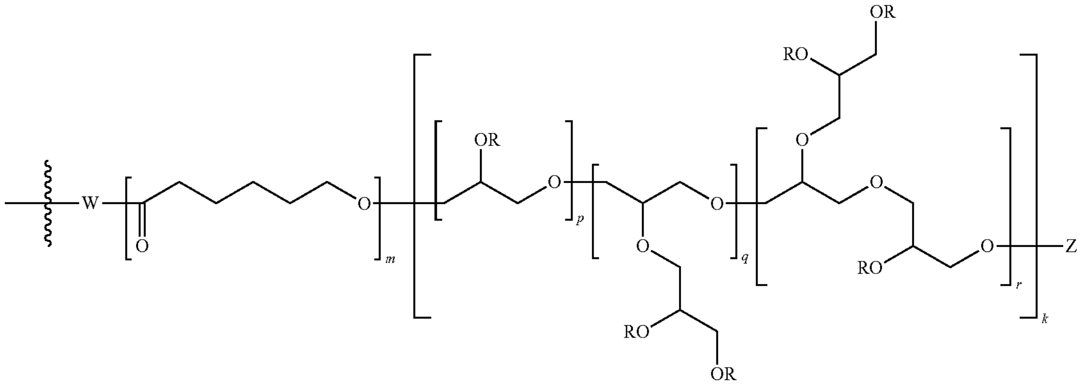

the index k is from 1 to 5.

A further embodiment of this aspect of the disclosed amphiphilic surfactants relates to highly branched poly(ε-caprolactone)-glycidol block co-polymers that are cross-linked. Non-limiting examples of crosslinking agents includes glycerol diglycidyl ether, 1,4-butanediol diglycidyl ether, and poly(ethyleneglycol) diglycidyl ether.

The formula below depicts the general manner in which glycerol diglycidyl ether can crosslink two chains of a disclosed amphiphilic surfactants:

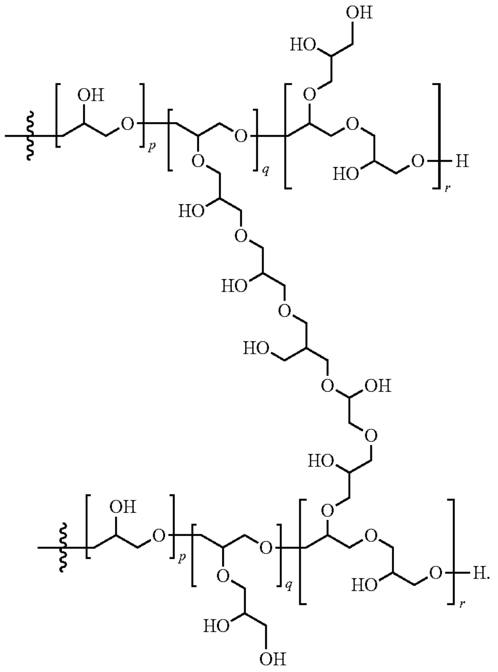

The crosslinking, however, can be between any available two hydroxyl groups on adjacent chains. This type of crosslinking between hydrophilic units can be generically represented by the following:

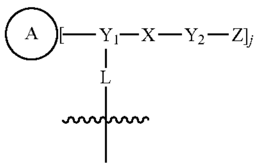

wherein L is a linking group as described herein bonded to at least one other polymer chain.

A further category of the amphiphilic surfactants relates to hydrophilic units that are form be the addition of modified polyoxyethylene glycol alkyl ethers having the formula:

$$R^1O(CH_2CH_2O)_jCH_2CO_2H$$

wherein R is a linear or branched alkyl group having from 1 to 4 carbon atoms and j is an integer of about 2 to about 50. Commercially available surfactants can be oxidized to the corresponding carboxylic acid by the procedure in Example 1 or by any means convenient to the formulator.

A further non-limiting example of commercially available alcohols that can be oxidized to a terminal carboxylic acid includes polyoxyethylene glycol alkyl ethers having the formula:

$$R^1(OCH(CH_3)CH_2)_jOCH(CH_3)CH_2OH$$

wherein $R^1$ is a linear alkyl group having from 1 to 4 carbon atoms and j is an integer from about 2 to about 50.

Another category of commercially available alcohols that can be oxidized to a terminal carboxylic acid includes polyoxyethylene polyoxypropylene block copolymers known as "poloxamers" having the formula:

$$R^1O(CH_2CH_2)_{j1}(CH_2CH_2CH_2O)_{j2}(CH_2CH_2O)_{j3}OH$$

wherein $R^1$ is a linear alkyl group having from 1 to 4 carbon atoms. These are nonionic block copolymers composed of a polypropyleneoxy unit flanked by a polyethyleneoxy alkyl ether unit and a polyethyleneoxy unit. The indices $j^1$, $j^2$, and $j^3$ have values such that the polymeric material has an average molecular weight of from about 1000 g/mol to about 20,000 g/mol.

Another aspect of the disclosed nanoparticle dispersants relates to compounds wherein a hydrophilic unit is directly connected to the nanoparticle core, for example, dispersants having the general formula:

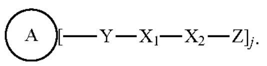

In one embodiment of this aspect, the polymers have the formula:

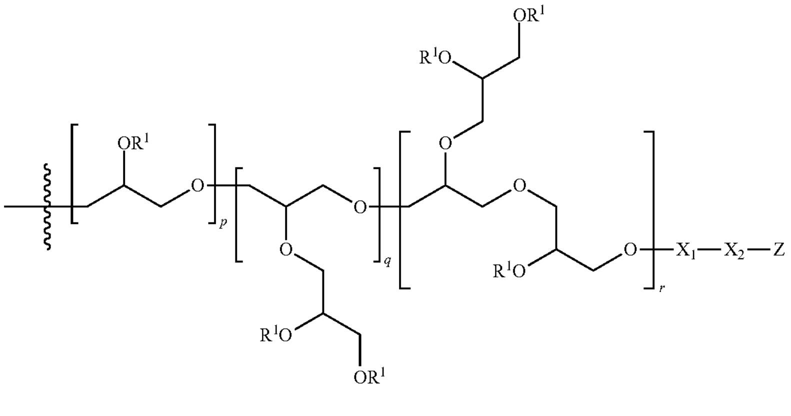

wherein the capping group Z is defined herein below or is the last moiety of the hydrophobic unit $X_2$;

each $R^1$ is independently:

i) hydrogen; or ii) one or more residues which comprise hydrophobic unit $X_1$;

iii) —$CH_2CHOR^1CH_2OR^1$;

the index p is from 1 to 5, the index q is from 0 to 5 and the index r is from 0 to 5.

For example, if caprolactone is grafted onto the hyperbranched Y unit above, the $R^1$ units would be either hydrogens or one or more units having the formula:

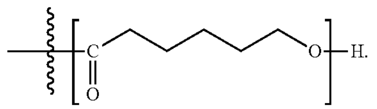

Alternatively, if a modified MPEG unit is comprises the $X_1$ unit then IV units would be either hydrogen or a, for example, $CH_3O(CH_2CH_2O)_nCH_2COO$— unit, wherein the index n reflects the molecular weight of the MPEG unit.

A non-limiting iteration of this embodiment has the formula:

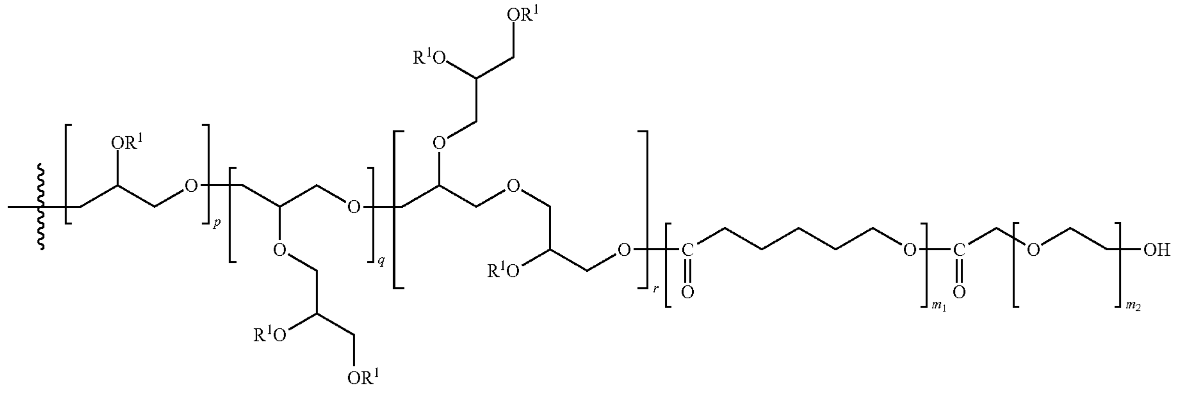

wherein the indices p, q and r are defined herein above and the index $m_1$ if from about 1 to about 50 and the index $m_2$ is from about 5 to about 250.

Capping Units, Z

The disclosed amphiphilic surfactants can have any capping group chosen by the formulator. In one aspect, as disclosed herein above, the capping group can be the terminal moiety of the hydrophilic unit. For example, an —OH unit which terminates a polymer formed from grafting of ethylene oxide or polyglycerol units. Alternatively, the terminal Z capping unit can be a —$OCH_3$ unit as in the case of a hydrophilic unit comprising a modified MPEG as shown in Example 1.

Non-limiting examples of other capping units includes —$(CH_2)_{2\text{-}4}CO_2M$, —$(CH_2)_{2\text{-}4}$ $OSO_3M$ or —$(CH_2)_{2\text{-}4}SO_3M$ wherein M is a suitable cation. Non-limiting examples of cations include sodium, potassium, calcium and ammonium. For example, a polymer having the formula:

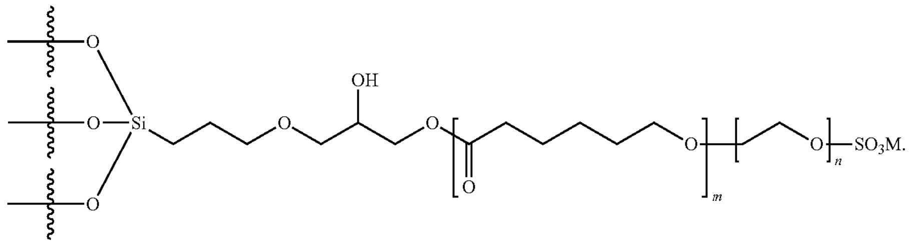

In the case of highly branched polymers, one or more of the terminal hydroxyl groups can be modified with a highly polar unit such as —$OSO_3M$.

Silica Nanoparticle Core

Figures 1A, 1B, 1C, 1D, 1E, 1F, 1G, 1H, 1I, 1J:
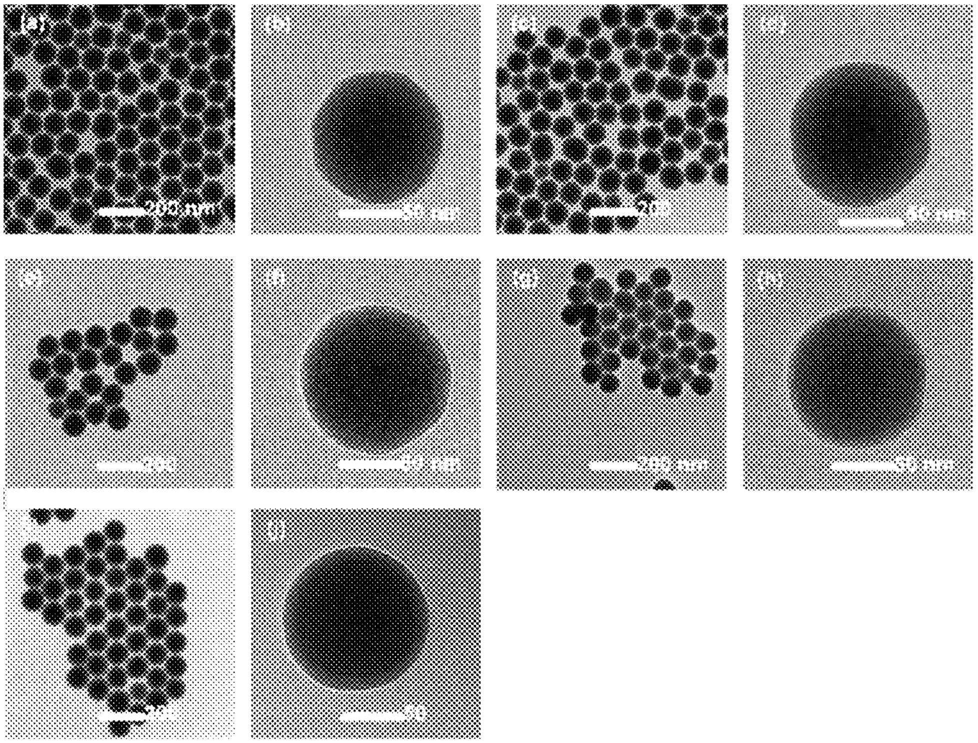
FIG. 1A is a transmission electron microscopy (TEM) image of the silica nanoparticles used in Example 1. The nanoparticles are dispersed in isopropanol and are unagglomerated with an average diameter of from about 70 nm to about 100 nm.
FIG. 1B is a high resolution TEM image of a particle depicted in FIG. 1A.
FIG. 1C is a TEM image of a modified nanoparticle prepared according to the procedure of Example 1.
FIG. 1D is a high resolution TEM of a particle depicted in FIG. 1C.
FIG. 1E is a TEM image of a modified nanoparticle prepared according to the procedure of Example 2.
FIG. 1F is a high resolution TEM of a particle depicted in FIG. 1E.
FIG. 1G is a TEM image of a modified nanoparticle prepared according to the procedure of Example 5.
FIG. 1H is a high resolution TEM of a particle depicted in FIG. 1G.
FIG. 1I is a TEM image of a modified nanoparticle prepared according to the procedure of Example 3.
FIG. 1J is a high resolution TEM of a particle depicted in Figure 1I.
Figures 2A, 2B, 2C, 2D:
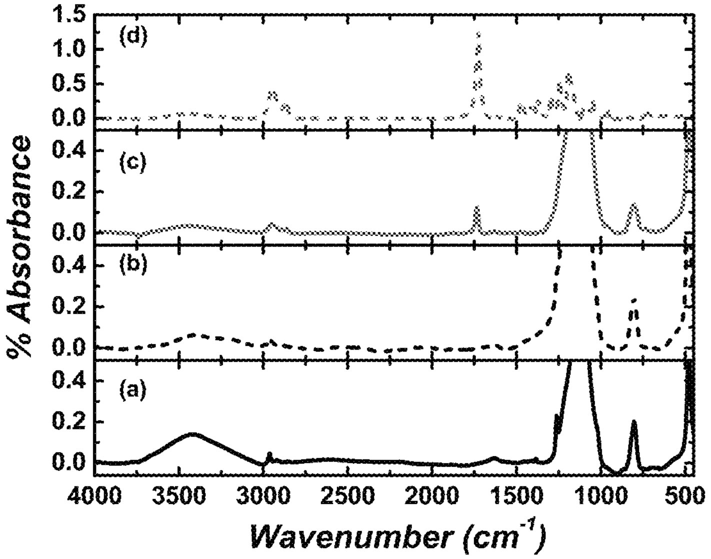
FIGS. 2A-2D are FTIR spectra of products and reagents in the preparation of the compounds obtained from Example 2.

Scheme I below depicts the modification of a silica nanoparticle with an anchoring unit as described in Example 1. In the example below surface functionalization is of a silica nanoparticle is achieved using the one-step chemical condensation reaction of 3-glycidoxypropyl)triethoxysilane with the silanol surface under basic aqueous reaction conditions. Under the conditions described in Example 1, the silane reagent 3-glycid-oxypropyl)triethoxysilane simultaneously condenses with surface silanols, while the epoxy groups hydrolyze to yield the desired alcohol initiating groups. As depicted in FIG. 2B there is negligible change in the FTIR spectrum of the product formed in Example 1 and the TEM images shown in FIG. 1C and FIG. 1D indicate little change in the morphology and size of the nanoparticles and that no agglomeration or aggregation exists due to crosslinking.

Scheme I

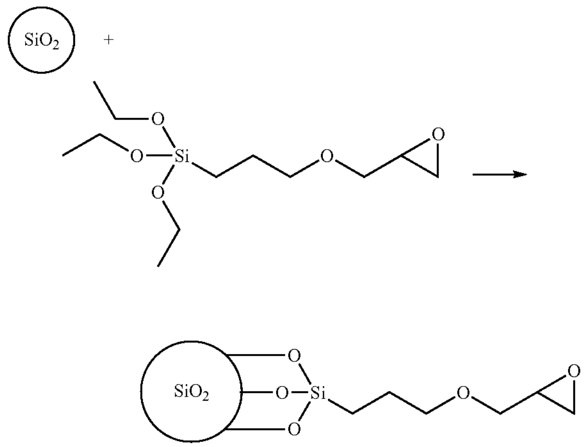

Example 1

Functionalization of a Nanoparticle with the Anchoring Unit 3-glycidoxy-propyl)triethoxysilane:

A silica nanoparticle suspension in isopropanol (particle size 70-100 nm, 30-31% Sift by weight) is diluted with deionized water such that 15.0 g of particles are present in 50.0 g of 30 wt % the silica nanoparticle aqueous solution wherein the final concentration of silica is less that about 0.2 g/mL at pH 10-12. 3-Glycidoxypropyl)triethoxysilane (16.4 g, 0.06 mol) is added and the solution is sonicated for 15 minutes after which the solution is refluxed for 36 hours. The functionalized silica particles are obtained by successive centrifuging-redispersion cycles in water and methanol. The particles are then dried for approximately 18 hours under vacuum to yield 11.4 g (75%) of the functionalized particles. The particles comprise approximately 1.4% by weight of the anchoring unit.

AS described in Example 1, surface functionalization is of a silica nanoparticle is achieved using the one-step chemical condensation reaction of 3-glycidoxypropyl)-triethoxysilane with the silanol surface under basic aqueous reaction conditions. Under the conditions described in Example 1, the silane reagent 3-glycidoxypropyl)triethoxysilane simultaneously condenses with surface silanols, while the epoxy groups hydrolyze to yield the desired alcohol initiating groups. As depicted in FIG. 2B there is negligible change in the FTIR spectrum of the product formed in Example 1 and the TEM images shown in FIG. 1C and FIG. 1D indicate little change in the morphology and size of the nanoparticles and that no agglomeration or aggregation exists due to crosslinking.

Figures 3A, 3B, 3C, 3D:
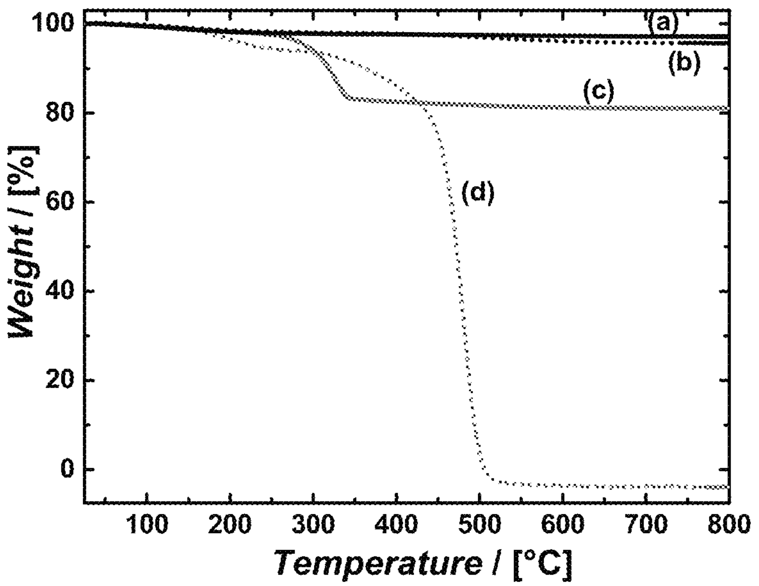
FIGS. 3A-3D are thermogravimetric analysis curves of various products and reagents in the preparation of the compounds obtained from Example 2.

FIG. 3B depicts the TGA data for the product obtained in Example 1. Only a small mass loss of approximately 4.2% at 700° C. is indicated. The product of Example 1 lost approximately 1.4% more mass than the silica nanoparticle itself (FIG. 3A).

Scheme II below depicts the addition of a caprolactone hydrophobic unit as described in Example 2.

Scheme II

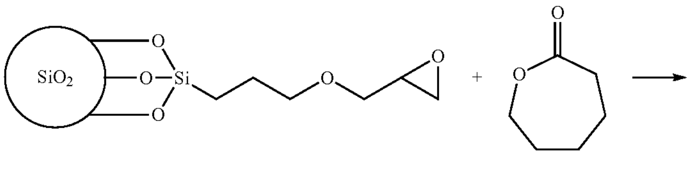

-continued

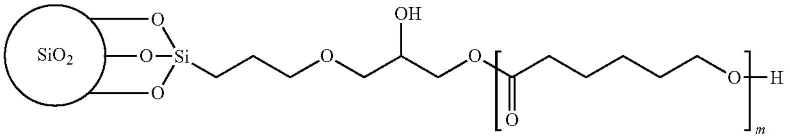

wherein the index m has the average value of 105.

Example 2

Attachment of Caprolactone Hydrophobic Unit:

Nanoparticles obtained in Example 1 (6.5 g) and caprolactone (200 g, 0.526 mol) are combined under argon and sonicated for 40 minutes. Stannous octoate, (tin(II) 2-ethylhexanoate) (156 mg, 0.40 mmol) is then added and the resulting solution is stirred and heated at 130° C. under argon. The grafted polymer is separated from any ungrafted polymer that forms as a side reaction by repeatedly dispersing the contents of the reaction into tetrahydrofuran (THF) and using sonication followed by centrifuging and decanting of the dissolved polymer solution to afford 6.5 g (85% yield) of the desired product comprising 14.7% by weight of polycaprolactone.

FIG. 2C is the FTIR spectrum of the product of Example 2. This spectrum contains a new absorption band at 1734 $cm^{-1}$ (C═O stretching of the ester) and a weaker absorption at 2935 $cm^{-1}$ (C—H stretching). FIG. 1E is the TEM image of the product of Example 2. Again there is no evidence of aggregation of particles. FIG. 3C is the TGA of this product which exhibited a significant change in the total mass loss (~18.9%) at 700° C. which corresponds to 14.7% of the mass being attributed to the polycaprolactone hydrophobic unit. The bulk of the observed loss occurred at same temperature range (300 to 500° C.) where free polycaprolactone exhibits thermal decomposition as depicted in FIG. 3E.

Scheme III below depicts the grafting of glycidol units to form a highly branched hydrophilic unit as described in Example 3.

Example 3

Grafting of glycidol to the polymer chain: Nanoparticles (500 mg) obtained in Example 2 are dispersed by sonication in anhydrous anisole in a 100 mL Schlenk flask. To this suspension was added glycidol (25 g, 0.34 mol) and the contents of the reaction flask is stirred under argon. Tin(II) trifluoromethanesulfonate (17.5 mg, 0.04 mmol) is added and the reaction vessel is heated at 95° C. for 30 minutes after which the flack is allowed to cool to room temperature. [In order to control the reaction to prevent undesired polymerization, the reaction temperature is not allowed to exceed 95° C.] Upon cooling, the contents of the reaction vessel separates into an upper anisole layer containing unreacted monomer and non-grafted highly polymerized glycidol. The lower viscous phase contains the desired product which is isolated by decanting off the upper layer and diluting the lower layer with methanol. The crude product is washed with a series of solvents by dispersion in the solvent, centrifugation, and removal of the solvent wash by decanting. The order of solvents washes is 2× methanol, 1× water and again 2× methanol. After drying 0.5 g (86% yield based on TGA measurement wherein 13.5% by weight constitutes the highly branched hydrophilic unit) of the desired product is obtained.

Example 4

Preparation of MPEG 500 a-carboxylic Acid:

To a 1 L reaction vessel is charged poly(ethylene glycol) methyl ether (average MW ~5000) (47.5 g; $9.50\times10^{-3}$ mol, 1 eq.) and acetone (310 mL). The contents of the flask is stirred until homogeneous. Jones reagent (10.6 g of $CrO_3$ Scheme III

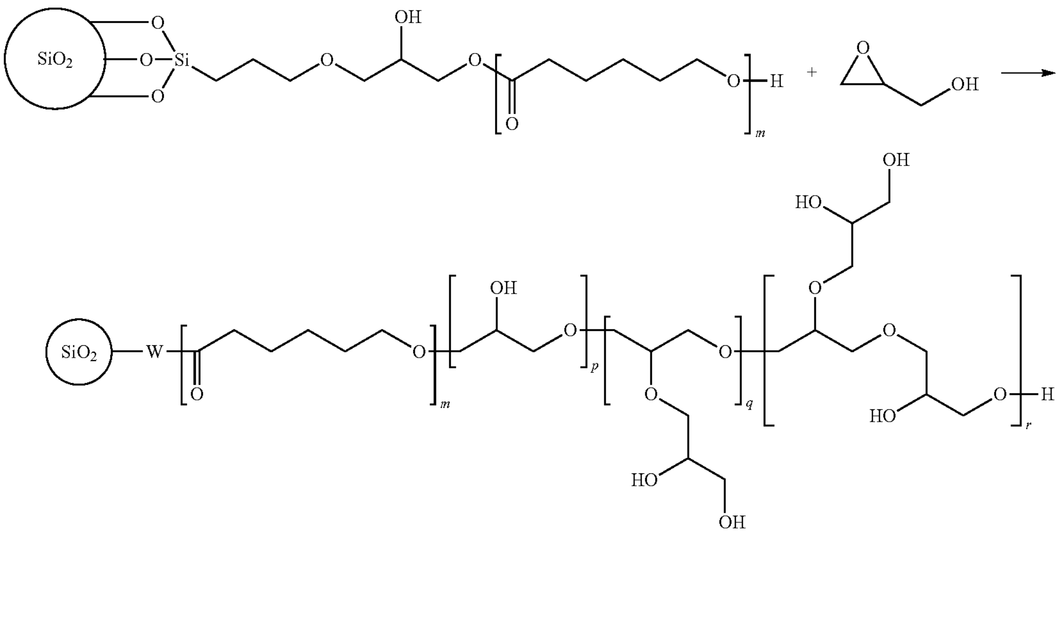

dissolved in 9.2 mL of $H_2SO_4$ and 40 mL of water) is added dropwise until the solution maintains a reddish color for about 10 minutes. The reaction solution is then diluted with water (200 mL) and washed three times with $CH_2Cl_2$ (300 mL). The organic phases are combined, washed three times with water and dried with anhydrous $MgSO_4$. The solvent is to afford 45.36 g (yield 95%) of the desired product. $^1H$ NMR [poly(ethylene glycol)] 8 ppm 3.354 ($—CH_3$) and 3.617 $—CH_2CH_2—$. $^1H$ NMR [MPEG-$CO_2H$] δ ppm 3.359 ($—CH_3$), 3.623 $—CH_2CH_2—$, and 4.139 $—CH_2COO^-$.

Scheme IV below depicts an aspect of the disclosed amphiphilic surfactants wherein the hydrophilic unit is a non-grafted unit according to Example 5.

FIG. 1G through FIG. 1J. Both amphiphilic surfactants exhibit a closely packed two-dimensional array rather than a three-dimensional agglomeration that indicates physical crosslinking between nanoparticle polymer chains.

As described herein above, one aspect of the disclosed dispersants relates to functionalizing the surface of the core nanoparticles with non-reactive anchoring units. This is a means for controlling the amount or the density of polymer that present thereby affording the formulator with a way to control the structure and function of the hydrophobic and hydrophilic chains. For example, by limiting the number of polymerizable units, there is space to form larger hyperbranched hydrophilic units and/or increase the amount of Scheme IV

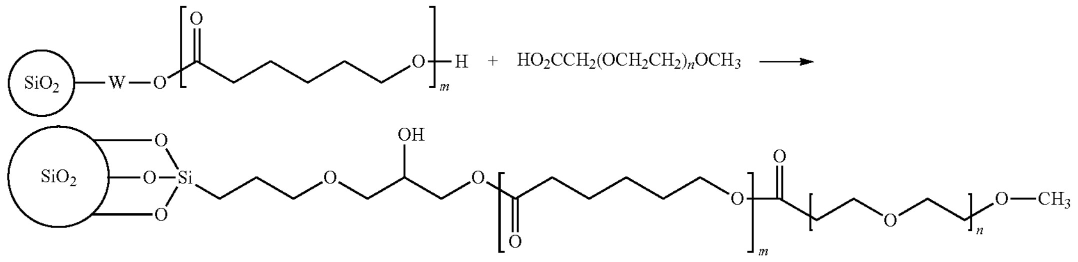

Example 5

Attachment of Modified MPEG 500 Hydrophilic Unit:

Nanoparticles (200 mg) obtained in Example 2 are suspended in dichloromethane (7.0 mL) and the modified MPEG from Example 4 (1.1 g, 0.22 mmol) in dichloromethane (7.0 mL) is added under $N_2$ flow. A solution of dicyclohexylcarbodiimide (130 mg, 0.60 mmol) and 4-dimethylaminopyridine (7.4 mg, 0.06 mmol) dichloromethane (2.0 mL) is added dropwise to the reaction mixture at 0° C. and the reaction mixture is stirred for 36 hours at room temperature. The resulting particles were washed with a series of solvents (dichloromethane, THF, acetone, water and methanol) by dispersion in the solvent, centrifugation, and removal of the solvent wash by decanting. After drying 150 mg (75% yield) of the desired functionalized nanoparticles are obtained. Based on TGA analysis 1% by weight of the particle mass is accounted for by the modified MPEG.

The retention of the strong carbonyl bands at 1734 $cm^{-1}$ in the FTIR spectrum of both the product Example 3 having a hyperbranched poly(glycerol) hydrophilic unit (FIG. 5B) and the product of Example 5 having a linear pre-formed hydrophilic unit (FIG. 4B) indicate that the poly(caprolactone) hydrophobic units are retained during the formation of both hydrophilic units. For example, by grafting as in Example 3 and condensation with a pre-formed polymer as in Example 5. As depicted in FIG. 5B the enhanced intensity of absorption between 2800 and 3000 $cm^{-1}$ due to C—H stretching and the stronger band from 3100 to 3500 $cm^{-1}$ due to OH stretching confirm the hyperbranched poly(glycerol) hydrophilic unit.

Figures 4A, 4B, 4C:
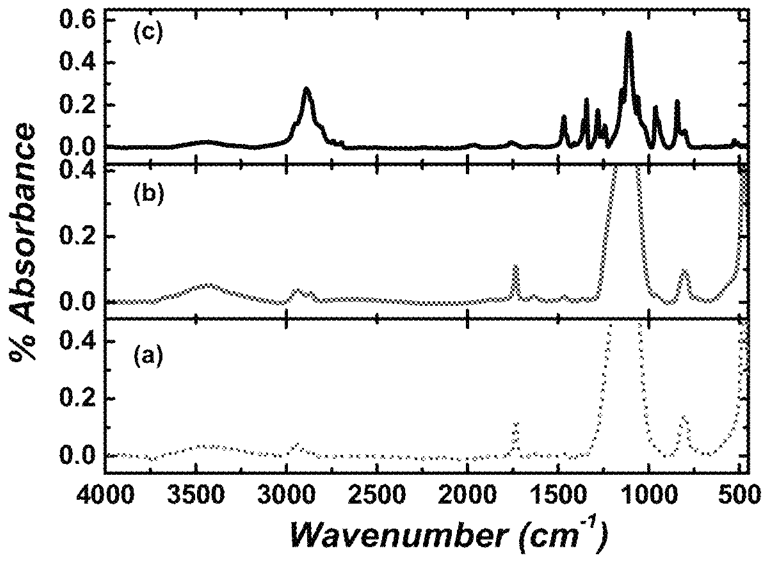
FIGS. 4A-4C are FTIR spectra of products and reagents in the preparation of the compounds obtained from Example 5.
Figures 5A, 5B, 5C:
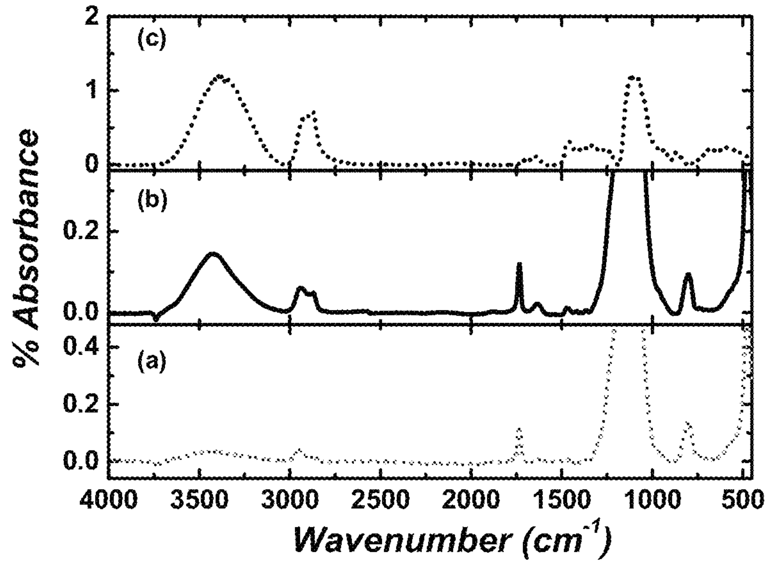
FIGS. 5A-5C are FTIR spectra of products and reagents in the preparation of the compounds obtained from Example 3.
Figures 6A, 6B, 6C:
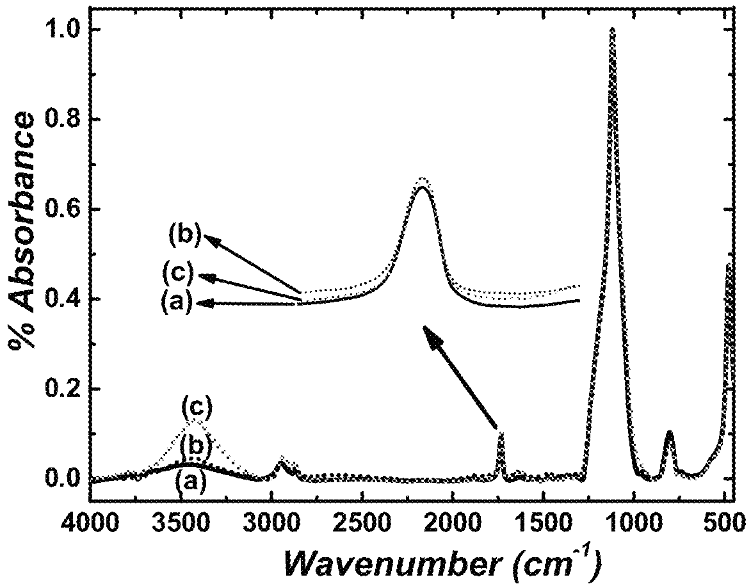
FIGS. 6A-6C compares the FTIR spectrum of a common intermediate and 2 amphiphilic surfactants according to the present disclosure.
Figures 7A, 7B, 7C, 7D, 7F:
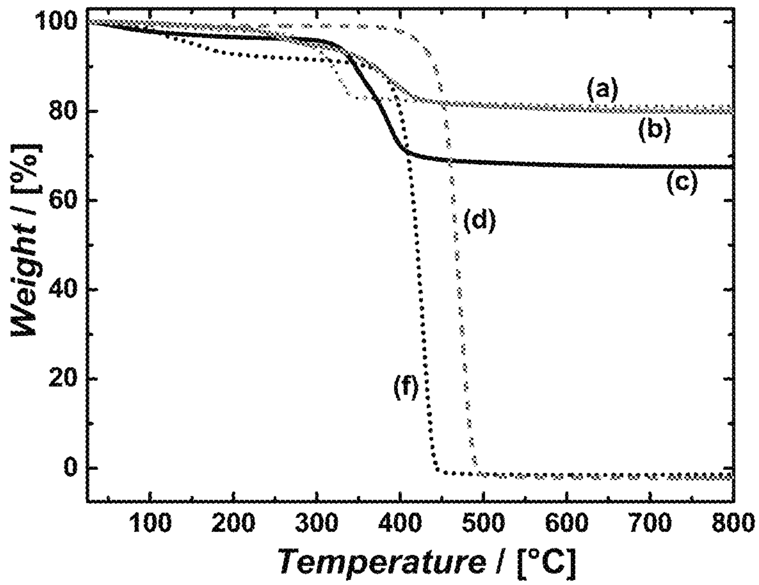
FIGS. 7A-7D and 7F are thermogravimetric analysis curves of various products and reagents in the preparation of the compounds obtained from Example 2.

As depicted in FIG. 4B an enhanced intensity of absorption between 2800 and 3000 $cm^{-1}$ due to the C—H stretching and the appearance of a slight shoulder at approximately 1361 $cm^{-1}$ is attributed to the $CH_2O—$ ether bonds of the poly(ethyleneglycol) hydrophobic unit.

The unaggregated nature of the products of Example 3 and Example 5 can be seen in the TEM images shown in linking groups. The following Example demonstrates the non-reactivity of an example unreactive anchoring unit.

Example 6

Functionalization of a Nanoparticle with the Anchoring Unit n-octyl Triethoxysilane:

A silica nanoparticle suspension in water (4.5 g of particles present in 15.39 g of 30 wt % nanoparticles) is added to a round bottom flask with a magnetic stir bar and fitted with a reflux condenser. n-Octyl triethoxysilane (5.2 g, 0.018 mol) is added and the resultant reaction mixture is diluted with deionized water to afford a silica nanoparticle concentration of approximately 0.2 g/mL. This suspension is sonicated for 15 min, at which point the pH is adjusted to 11 by the addition of a 1 M aqueous NaOH solution. The reaction mixture is then refluxed for 36 hours to complete the functionalization of the nanoparticles. The reaction solution is cooled to room temperature after which the functionalized nanoparticle are repeatedly sonicated in water to disperse them in solution and then centrifuged for 30 minutes at 10,000 rpm to isolate from the solvent and obtain a neutral pH. The removal of any unreacted n-octyl triethoxysilane from the functionalized nanoparticles is then achieved by successive centrifuging-redispersion cycles in methanol. The functionalized nanoparticles are dried overnight under vacuum at room temperature to afford 3.32 g of the desired product.

Reaction of the Nanoparticle Functionalized with a Non-Reactive Anchoring Unit with Caprolactone:

500 mg of the functionalized nanoparticles obtained above is dispersed in caprolactone (60 g, 0.526 mol) by sonication in a 100 mL two-neck round bottom flask fitted with a magnetic stirring bar. After 40 minutes of Ar purging, stannous octoate, (48.00 mg, 0.12 mmol) is added to the suspension under Ar flow. The flask is placed in a thermostatic oil bath at 130° C. and the suspension stirred for 5.5 hours under Ar. The unreacted functionalized silica nanoparticles are isolated from free polymer by repeatedly dispersing in THF (by sonication), centrifuging, and decanting the THF solution to remove any poly(caprolactone). After drying under vacuum, 500 mg of the starting material is isolated.

The following describe the procedures for forming functionalized nanoparticles having an admixture of non-reactive anchoring units and anchoring units comprising a hydrophobic unit.

Example 7

Preparation of Nanoparticles Having 80% Caprolactone Hydrophobic Units and 20% Non-Reactive Anchoring Units:

An aqueous suspension of silica nanoparticles (4.5 g in 15.39 g of 30 wt % nanoparticles) is added to a round bottom flask with a magnetic stir bar and fitted with a reflux condenser. n-Octyl triethoxysilane (1.02 g, 3.68 mmol) and 3-glycidoxypropyl)triethoxysilane (4.0 g, 14.37 mmol) are added and the resulting reaction mixture is diluted with deionized water to reach a concentration of silica nanoparticles of approximately 0.2 g/mL. The suspension is sonicated for 15 minutes, at which point the pH is adjusted to 11 by the addition of a 1 M aqueous NaOH solution. The reaction mixture is then refluxed for 36 hours. After cooling to room temperature, the functionalized nanoparticles are repeatedly sonicated in neutral water to disperse them after which the solution is centrifuged for 30 minutes at 10,000 rpm to separate them from the solvent and until the pH is neutral. Unreacted n-octyl triethoxysilane and 3-glycidoxypropyl)-triethoxysilane are removed by successive centrifuging-redispersion cycles in methanol. Finally, the isolated particles are dried overnight under vacuum at room temperature to afford 3.32 g of the desired product.

500 mg of the functionalized nanoparticles obtained in the above procedure are dispersed in caprolactone (60 g, 0.526 mol) by sonication in a 100 mL two-neck round bottom flask fitted with a magnetic stirring bar. After 40 min of Ar purge, stannous octoate, (48.00 mg, 0.12 mmol) is added to the suspension under Ar flow. The flask is placed in a thermostatic oil bath at 130° C. and the suspension stirred for 5.5 hours under Ar. The resulting functionalized nanoparticles are isolated from any poly(caprolactone) that is formed by repeatedly dispersing in THF (with sonication), centrifuging, and decanting the THF solution to remove the poly (caprolactone). After drying under vacuum, 560 mg of the desired product is isolated.

Figure 10:
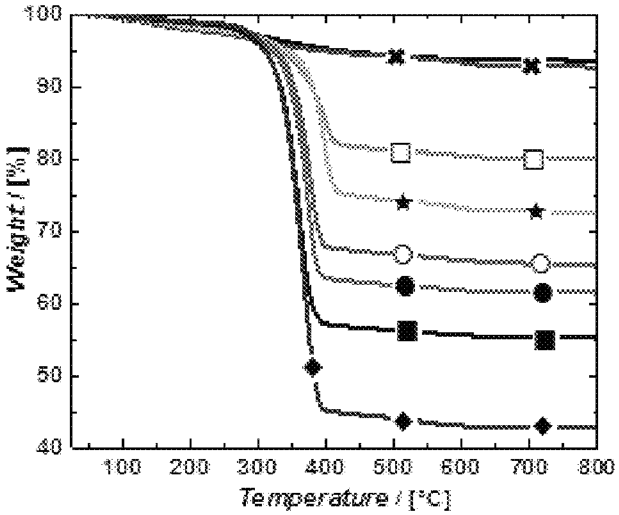
FIG. 10 shows the TGA curves for various dispersant intermediates wherein the amount of poly(caprolactone) hydrophobic units are varied. The top line bearing the symbol ✖ is an overlap of two lines representing the silica nanoparticles and nanoparticles functionalized with the n-octyl triethoxysilane anchoring unit. The lines in descending order are functionalized with 1.25% poly(caprolactone), □, 2.5% poly(caprolactone), ★, 5% poly(caprolactone), ○, 10% poly(caprolactone), ●, 15% poly(caprolactone), ■, and 20% poly(caprolactone), ♦.

FIG. 10 shows the TGA curves for various dispersant intermediates wherein the amount of poly(caprolactone) hydrophobic units are varied. The top line bearing the symbol ✖ is an overlap of two lines representing the silica nanoparticles and nanoparticles functionalized with the n-octyl triethoxysilane anchoring unit. The lines in descending order are functionalized with 1.25% poly(caprolactone), □, 2.5% poly(caprolactone), ★, 5% poly(caprolactone), ○, 10% poly(caprolactone), ●, 15% poly(caprolactone), ■, and 20% poly(caprolactone), ♦.

Figure 11:
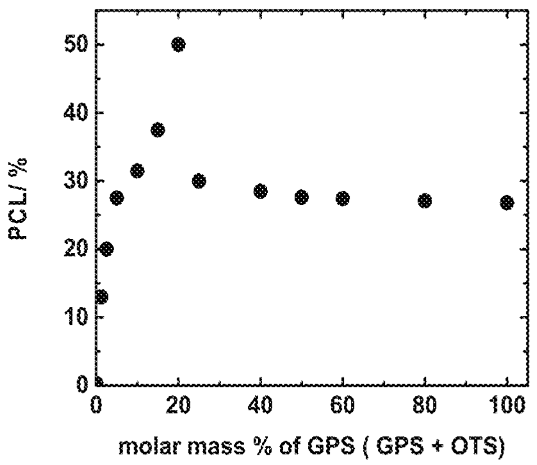
FIG. 11 depicts the relationship between the ratio of n-octyl triethoxysilane anchoring units and 3-(glycidoxypropyl)triethoxysilane units versus the percentage of poly (caprolactone) present in the resultant hydrophobic unit. For example, 100% n-octyl triethoxysilane results in 0% poly (caprolactone) while 80% n-octyl triethoxysilane (20% 3-(glycidoxypropyl)triethoxysilane) results in 50% molar mass poly(caprolactone).

FIG. 11 depicts the relationship between the ratio of n-octyl triethoxysilane anchoring units and 3-(glycidoxypropyl)triethoxysilane units versus the percentage of poly (caprolactone) present in the resultant hydrophobic unit. For example, 100% n-octyl triethoxysilane results in 0% poly (caprolactone) while 80% n-octyl triethoxysilane (20% 3-(glycidoxypropyl)triethoxysilane) results in 50% molar mass poly(caprolactone). Therefore, by adjusting the relative amounts of reactive and non-reactive anchoring units, the formulator can control the amount of hydrophobic unit that is present in the dispersant.

Figure 12:
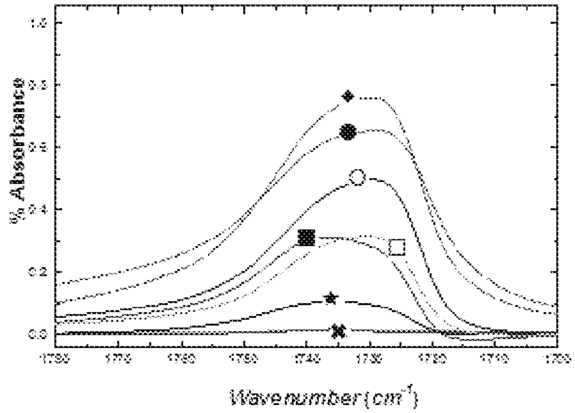
FIG. 12 is a section of the FTIR C═O stretch for a series of dispersants wherein the ratio of reactive to non-reactive anchoring units is varied. Symbol, ✖, is the control (silica nanoparticle); symbol, ★, 1.3 mol % 3-(glycidoxypropyl) triethoxysilane (GPS) to and 98.7 mol % n-octyl triethoxysilane (OTS); symbol, ■, 2.6 mol % GPS:97.4 mol % OTS.

FIG. 12 is a section of the FTIR for a series of dispersants prepared in the manner of Example 5 but wherein the number of reactive and non-reactive anchoring units are varied. This section of the FTIR relates to the growing intensity of the C═O stretch due to the increasing amount of poly(caprolactone) present because silica nanoparticles having a greater percentage of reactive anchoring units, i.e., 3-(glycidoxypropyl)triethoxysilane units will have a greater amount of grafted poly(carolactone). The dispersant which curve is indicated with the symbol, ✖, is the FTIR of the silica nanoparticles which would not be expected to have any C═O absorbance. The dispersant which curve is indicated with the symbol, ★, was prepared with approximately 1.3 mol % 3-(glycidoxypropyl)triethoxysilane and approximately 98.7 mol % n-octyl triethoxysilane. The dispersant which curve is indicated with the symbol, ■, was prepared with approximately 2.6 mol % 3-(glycidoxypropyl)triethoxysilane and approximately 97.4 mol % n-octyl triethoxysilane. The dispersant which curve is indicated with the symbol, □, was prepared with approximately 5 mol % 3-(glycidoxypropyl)triethoxysilane and approximately 95 mol % n-octyl triethoxysilane. The dispersant which curve is indicated with the symbol, ○, was prepared with approximately 9.8 mol % 3-(glycidoxypropyl)triethoxysilane and approximately 90.2 mol % n-octyl triethoxysilane. The dispersant which curve is indicated with the symbol, ●, was prepared with approximately 14.6 mol % 3-(glycidoxypropyl)-triethoxysilane and approximately 85.4 mol % n-octyl triethoxysilane. The dispersant which curve is indicated with the symbol, ♦, was prepared with approximately 20.4 mol % 3-(glycidoxypropyl)triethoxysilane and approximately 79.6 mol % n-octyl triethoxysilane.

Scheme V herein below depicts the first step in preparing a dispersant having the general formula:

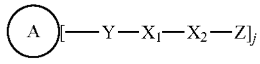

wherein the hydrophilic unit serves as an anchoring unit. The procedure is described in Example 7 herein below.

Scheme V

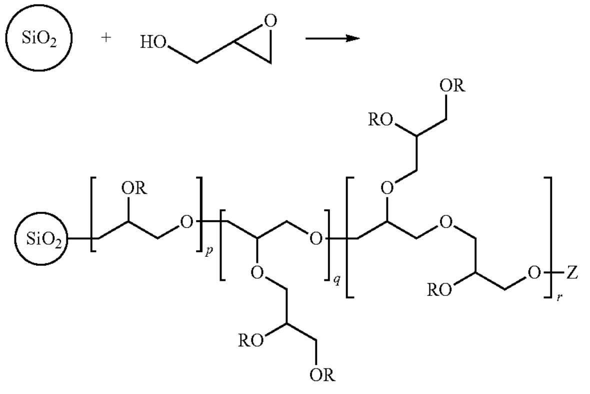

Example 7

Formation of a Hyperbranched Hydrophilic Unit as an Anchoring Unit:

Dried silica nanoparticles are further dried at 110° C. for 2 hours under vacuum. Silica nanoparticles (3.0 g) are dispersed by sonication in anhydrous anisole (60 mL) in a 100 mL Schlenk flask. To this suspension is added glycidol (30 g, 0.40 mol) and a magnetic stirring bar. The contents of the vessel is purge with argon of 40 minutes after which tin(II) trifluoromethanesulfonate (20.84 mg, 0.05 mmol) is added. The flask is placed in a thermostatic oil bath at 95° C. washed with a series of solvents by dispersion and the suspension is stirred for 2 hours. After cooling, the crude product is dispersed in solvent, and free unbound hyperbranched glycidol polymer is removed by centrifugation, and removal of the solvent wash by decanting. The order of solvents washes used is 2× methanol, 1× water and again 2× methanol. Finally, the isolated product is vacuum dried overnight to afford 3.26 g of the desired product.

Using the same procedure as described in Example 2, caprolactone can be grafted onto the free hydroxyl units of the hydrophilic unit to form a first poly(caprolactone) hydrophobic unit. Scheme VI below depicts the second step in preparing a the dispersant wherein a poly(caprolactone) first hydrophobic unit is grafted onto the hyperbranched hydrophilic unit.

Scheme VI

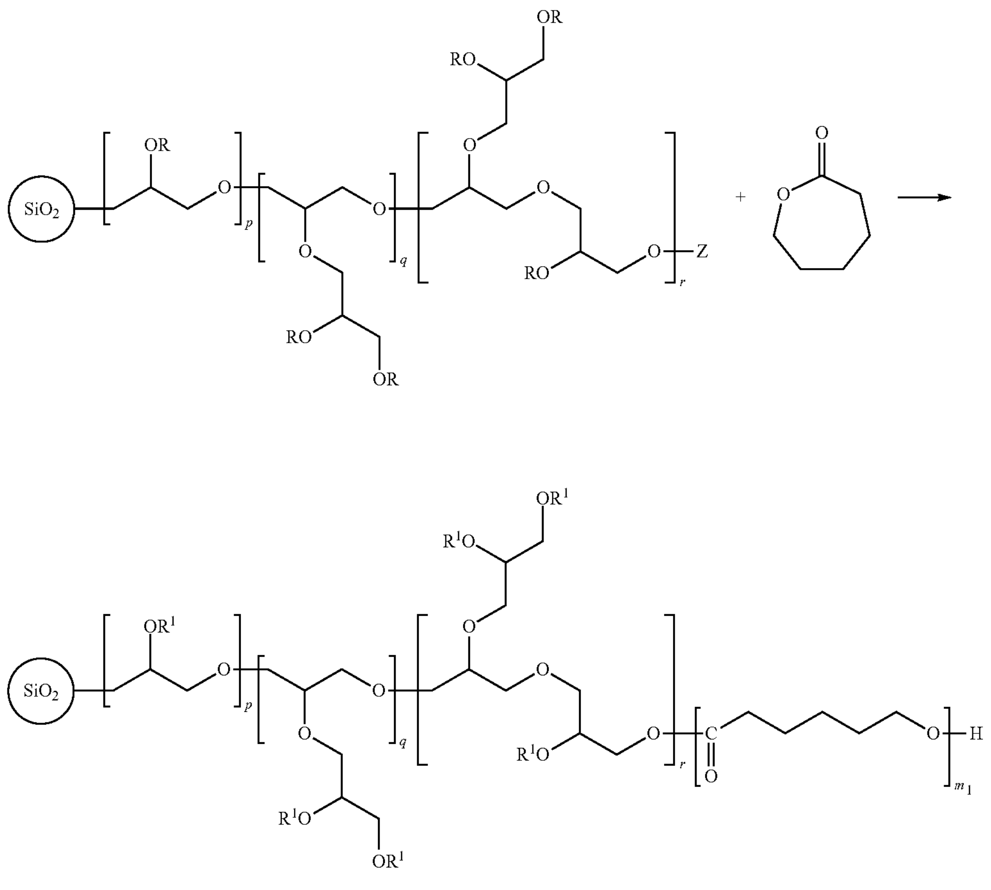

wherein each $R^1$ unit is hydrogen or a poly(caprolactone) unit having the formula:

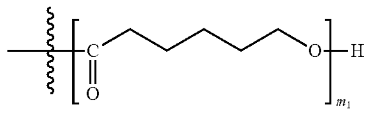

The aggregate value of the indices $m_1$ can be determined by either calculating the increase in mass of the particles formed or alternatively by subtracting the amount of poly (caprolactone) by product from the amount of caprolactone starting material.

Subsequent to the formation of poly(caprolactone) first hydrophobic units, modified MPEG units as described in Examples 4 and 5 can be reacted with the product above to form dispersants with a second hydrophobic unit. For example, as depicted in Scheme VII -continued

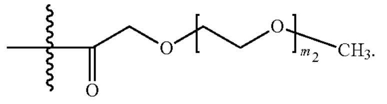

FIG. 13 represents the infrared spectra of the various products represented in Schemes V and VI. The spectrum labeled (a) (bottom) is the FTIR of the starting silica nanoparticles. The spectrum labeled (b) (middle) is the FTIR of the product of Scheme V, silica nanoparticles having a hyperbranched poly(glycidol) hydrophilic unit. The spectrum labeled (c) (second from the top) is the FTIR of the product of Scheme VI, particles having poly(caprolactone) units grafted onto the poly(glycidol) units. Spectra (d) and (f) are for reference and comparison. Spectrum (d) is pure poly(caprolactone) and spectrum (f) is pure hyperbranched poly(glycidol).

Scheme VII

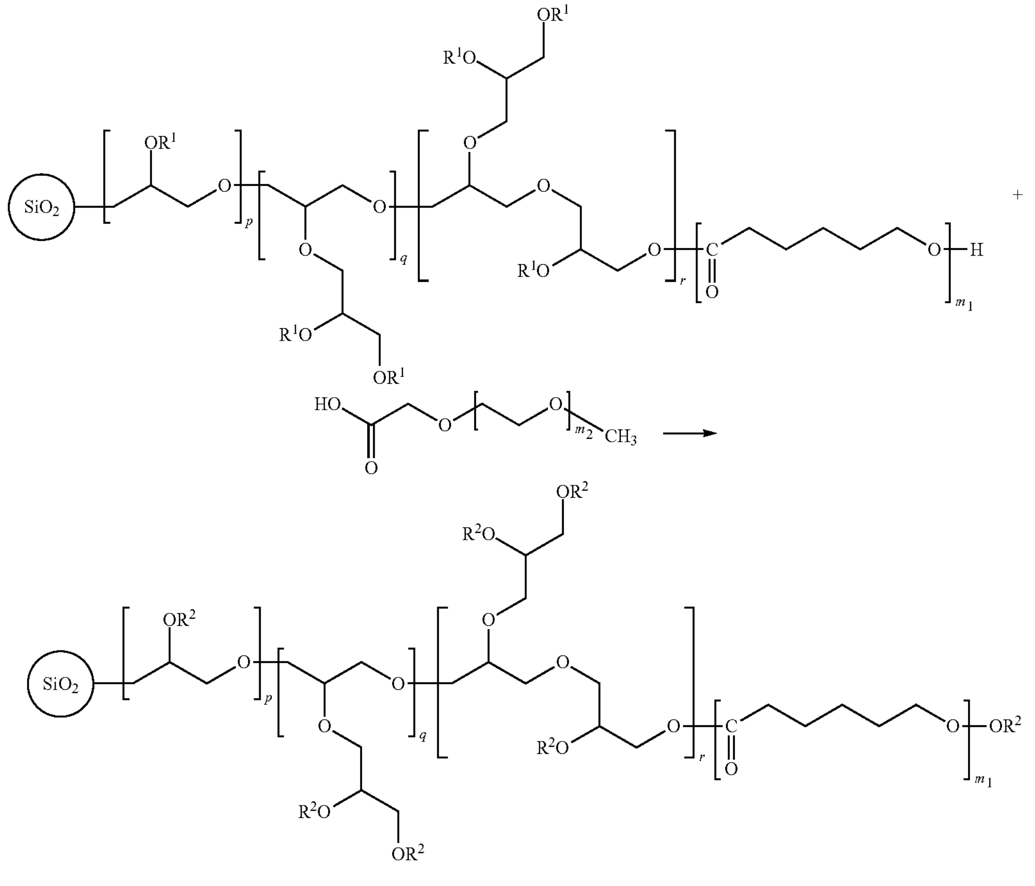

wherein $R^2$ is hydrogen or a unit chosen from:

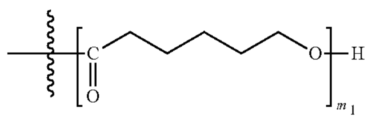

or

FIG. 14 represents the TGA curves of the various products represented in Schemes V, VI and VII. Curve (a) is the TGA of the silica nanoparticle starting material. Curve (b) is the TGA of the product of Scheme V, silica nanoparticles having a hyperbranched poly(glycidol) hydrophilic unit. Curve (c) is the TGA of the product of Scheme VI, particles having poly(caprolactone) units grafted onto the poly(glycidol) units. Curve (d) is the TGA of the product of Scheme VII wherein the modified MPEG of Example 4 is reacted with the product of Scheme VI, i.e., particles having poly(caprolactone) units grafted onto the poly(glycidol) units. Curves (e) and (f) are provided for reference. Curve (e) is pure poly(caprolactone) and curve (f) is pure hyperbranched poly(glycidol).

Example 8

Formation of Amphiphilic Surfactants Having a Hyperbranched Hydrophilic Unit that is Crosslinked with Glycerol Didglycidyl Ether:

Silica nanoparticles are vacuum dried at 110° C. for 2 hours then 500 mg is dispersed by sonication in anhydrous anisole (18 Ml) in a 100 Ml Schlenk flask. To this suspension is added glycidol (4.6 g, 0.062 mol) and glycerol diglycidyl ether (4.6 g, 0.022 mol). The reaction solution is purged for 40 minutes with argon then tin(II) trifluoromethanesulfonate (9 mg, 0.017 mmol) is added. The flask is placed in a thermostatic oil bath at 95° C. for 90 minutes. The crude product is washed with a series of solvents by dispersing the product in the solvent, centrifuging, and removing the solvent wash by decanting. The order of solvents washes was 2× methanol, 1× water and again 2× methanol. The isolated product is vacuum dried overnight to yield 0.5 g of the crosslinked hydrophilic unit bound to silica nanoparticles.

Grafting of Caprolactone onto the Crosslinked Hydrophilic Units:

To 100 mL two-neck round bottom flack fitted with a magnetic stirring bar is added the crosslinked intermediate formed in the procedure above (125 mg) and caprlactone (60 g, 0.526 mol). The admixture is sonicated to disperse the reactants 125 mg of crosslinked HPG functionalized $SiO_2$NPs were dispersed in 60 g of CL (0.526 mol) by sonication in a 100 Ml two-neck round bottom flask fitted with a stir bar. After 40 minutes of Ar purge stannous octoate (48.00 mg, 0.12 mmol) is added and the flask placed in a thermostatic oil bath at 130° C. and the suspension is stirred for 5.5 hours under Ar. The crude product is isolated from free poly (caprolactone) side product by repeatedly dispersing in THF (by sonication), centrifuging, and decanting the THF solution. After drying under vacuum, 130 mg of the desired product is obtained.

Example 9

Formation of Amphiphilic Surfactant Intermediate Having a Hyperbranched Hydrophilic Unit that is Crosslinked with 1,4-Butanediol Diglycidyl Ether:

To a 50 mL Schlenk flask is charged silica nanoparticles (500 mg) and anhydrous anisole (11 mL). The mixture is sonicated to disperse the silica nanoparticles. Glycidol (2.7 g, 0.036 mol) and 1,4-butanediol diglycidyl ether (2.78 g, 0.014 mol) are added and the solution stirred under argon purge for 40 minutes after which tin(II) trifluoromethanesulfonate (5 mg, 0.012 mmol) is added. The reaction vessel is heated at 95° C. for 70 minutes. The crude product is washed with a series of solvents by dispersion in the solvent, centrifugation, and removal of the solvent wash by decanting. The order of solvents washes is 2× methanol, 1× water and again 2× methanol. After vacuum drying 1.8 g of the desired material is obtained.

Example 10

Formation of Amphiphilic Surfactant Intermediate Having a Hyperbranched Hydrophilic Unit that is Crosslinked with Poly(Ethylene Glycol) Diglycidyl Ether:

To a 50 mL Schlenk flask is charged silica nanoparticles (250 mg) and anhydrous anisole (6.5 mL). The mixture is sonicated to disperse the silica nanoparticles. Glycidol (2.6 g, 0.035 mol) and poly(ethylene glycol) diglycidyl ether (0.67 g, 1.34 mmol) are added and the solution stirred under argon purge for 40 minutes after which tin(II) trifluoromethanesulfonate (2.6 mg, 0.006 mmol) is added. The reaction vessel is heated at 95° C. for 2 hours. The crude product is washed with a series of solvents by dispersion in the solvent, centrifugation, and removal of the solvent wash by decanting. The order of solvents washes is 2× methanol, 1× water and again 2× methanol. After vacuum drying 0.19 g of the desired material is obtained.

Calcium Carbonate Nanoparticle Core

Scheme VIII depicts the functionalization of a $CaCO_3$ nanoparticle with an anchoring unit as described in Example 11 herein below.

Scheme VIII

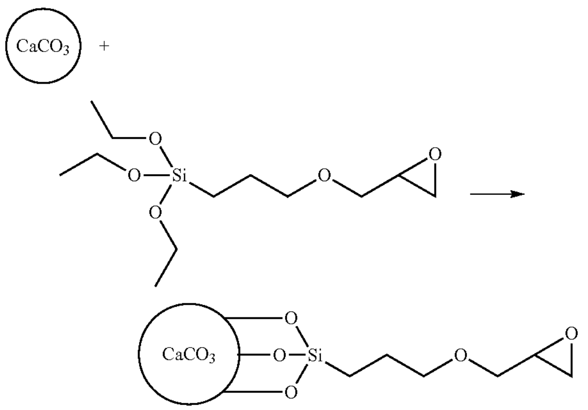

Example 11

Functionalization of a Nanoparticle with the Anchoring Unit 3-glycidoxy-propyl)triethoxysilane:

To a round bottom flask is charged $CaCO_3$ (2.5 g) and water (20 mL). 3-Glycidoxypropyl)triethoxysilane (2.7 g, 9.69 mol) is added and the mixture sonicated for 15 minutes after which the pH is adjucted to 11 b the addition of 1 M NaOH. The reaction mixture is brought to reflux for 36 hours. After cooling to room temperature the crude mixture is sonicated in water and centrifuged for 30 minutes at 10,000 rpm the supernatant decanted until the pH is 7. The poly(glycerol) silane side products are removed by successive centrifugation and re-dispersion in methanol. The product is dried to afford 2.3 g of the desired material.

Scheme IX below depicts the addition of a caprolactone hydrophobic unit as described in Example 12.

Scheme IX

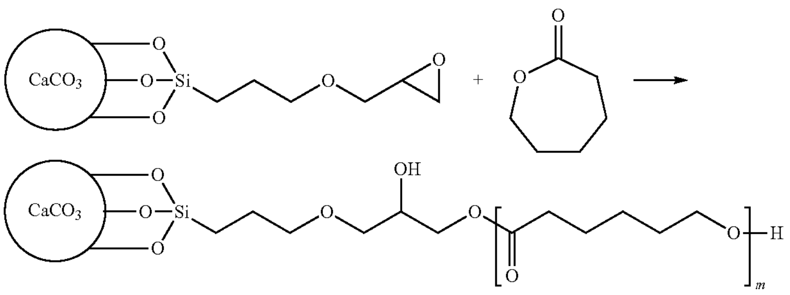

wherein the index m has the average value of from about 50 to about 200.

Example 12

Attachment of Caprolactone Hydrophobic Unit:

To a 100 mL two-neck round bottom flask is charged the product from Example 11 (1.5 g) and caprolactone (60 g, 0.526 mol). After 40 minutes of argon purge, stannous octoate, (tin(II) 2-ethylhexanoate) (48 mg, 0.12 mmol) is added and the resulting solution is stirred and heated at 130° C. under argon for 4 hours. The grafted polymer is separated from any poly(caprolactone) that forms as a side reaction by repeatedly dispersing the contents of the reaction into tetrahydrofuran (THF) and using sonication followed by centrifuging and decanting of the dissolved polymer solution to afford after drying 1.3 g of the desired product

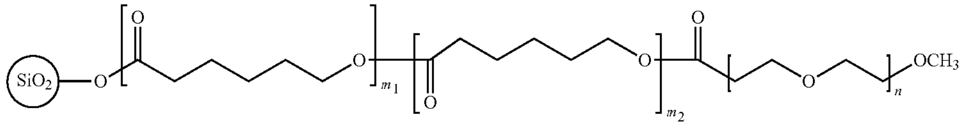

FIG. 15C is the FTIR spectrum of the isolated product of Example 12 which depicts a new absorption band at 1734 $cm^{-1}$ (attributed to the C═O stretching of the ester) and a weaker absorption at 2935 $cm^{-1}$ (consistent with the C—H stretching) in contrast to the starting material obtained in Example 11 and which FTIR is depicted in FIG. 15B. FIG. 15A is the FTIR of the $CaCO_3$ nanoparticles and FIG. 15D is the FTIR of poly(caprolatone).

As disclosed herein above, the formulator can tune the length of the various units, for example, the length of the hydrophobic unit. The following is a non-limiting example of the process for controlling the mass of a hydrophobic unit, X, by iteratively isolating and further reacting the isolated product with a hydrophobic unit forming monomer. The resulting amphiphilic surfactants have the general formula:

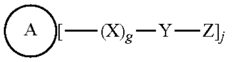

wherein the index g is from 2 to about 10.

Example 13

Preparation of an amphiphilic surfactant wherein g=2: To a 50 mL two-neck round bottom flask is charged the intermediate obtained in Example 2 (0.7 g) and caprolactone (21 g, 0.184 mol). After purging with argon for 40 minutes, stannous octoate (24 mg, 0.06 mmol) is added and the solution heated to 130° C. for 5 hours. After cooling, the twice grafted polymer is separated from any poly(caprolactone) side product by repeatedly dispersing the contents of the reaction into tetrahydrofuran (THF) and using sonication followed by centrifuging and decanting of the dissolved polymer solution to afford the desired product which is used without further purification.

The dispersant intermediate formed above is reacted with the product of Example 4 in the same manner as described in Example 5 to form an amphiphilic surfactant having the general formula:

wherein $m_1$ and $m_2$ are the same or different and are the average number of poly(caprolactone) units grafted in the first and second hydrophobic units. The indices $m_1$ and $m_2$ are each from 1 to about 50. The index n has an average value of about 105.

Using the same iterative procedure, further poly(carpolactone) units can be added prior to reaction with a hydrophilic unit forming monomer or reagent, i.e., modified MPEG as in Example 5. FIG. 16 depicts the variation in TGA for dispersants prepared as above with varying iterations of poly(caprolactone) grafting. The dispersant which curve is indicated with, ♦, has one grafted poly(caprolactone) hydrophobic units (g=1); The dispersant which curve is indicated with, ●, has two grafted poly(caprolactone) hydrophobic units (g=2); curve indicated with, ■, has three grafted poly(caprolactone) hydrophobic units (g=3); curve indicated with, ○, has four grafted poly(caprolactone) hydrophobic units (g=4); and curve indicated with, □, has is the TGA of poly(caprolactone).

FIG. 17 shows the relationship between the number of polymerization cycles and the amount of poly(caprolactone) hydrophobic units in the resulting dispersant. FIG. 18 is a section of the FTIR for a series of dispersants wherein the poly(caprolactone) hydrophobic region is iteratively formed. This section of the FTIR relates to the growing C═O stretch due to the increasing amount of poly(caprolactone) in each successive iteration. Curve (a) is a dispersant comprising a 3-glycidoxypropyl)triethoxysilane anchoring unit, poly(caprolactone) hydrophobic unit and a modified MPEG hydrophilic unit, for example, the dispersant obtained in Example 5. FTIR curve (b) represents the same anchoring and hydrophilic units, however, as described in Example 13, a second iteration of caprolactone grafting was conducted. FTIR curve (c) is the dispersant wherein three iterations of caprolactone grafting were conducted. FTIR curve (d) is the dispersant wherein four iterations of caprolactone grafting were conducted. FTIR curve (e) is the dispersant wherein five iterations of caprolactone grafting were conducted.

Methods

Disclosed herein are methods for absorbing hydrophobic substances that are dispersed in an aqueous medium. In general, when unwanted and/or dangerous substances that are not water soluble are dispersed into an aqueous medium, the disclosed amphiphilic surfactants can be used to absorb, collect, entrain or otherwise provide a means for removing the undesirable compounds from the aqueous media. Hydrophobic substances include raw petroleum, partially refined petroleum, lipids, mono-, di- and triglycerides, lipophilic insecticides, lipophilic herbicides, and the like. A non-limiting example of a circumstance that utilizes the disclosed amphiphilic surfactants is an oil spill in a lake, stream, river, swamp, ocean and the like. The aqueous medium has as its principle component water, for example, the aqueous medium comprises greater than 99% water exclusive of any flora or fauna within the aqueous environment.

As such, disclosed herein is a method for removing a hydrophobic substance from an aqueous medium, comprising:

A) contacting an aqueous medium containing one or more hydrophobic substances with one or more of the disclosed amphiphilic surfactants wherein the hydrophobic substances are entrained by the surfactant; and B) removing the amphiphilic surfactant.

For the purposes of the disclosed methods, the term "removing" means to capture, filter off, decant from the surface or bottom, or otherwise collect the surfactant that contains the hydrophobic substance. A continuous cycling of an aqueous medium over a filter or other matrix wherein a disclosed surfactant is entrained or held.

Figure 8A:
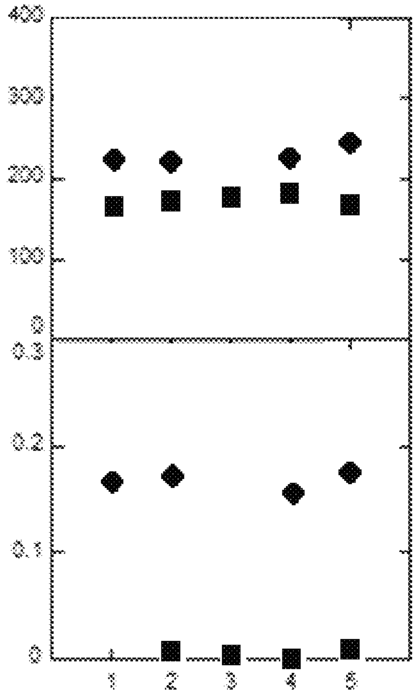
FIG. 8A depicts the polydispersity index for the surfactant obtained from Example 3 (■) and Example 5 (♦) in water before treatment with 4-heptylphenol and FIG. 8B bottom graph depicts the polydispersity index for the surfactant obtained from Example 3 (■) and Example 5 (♦) after treatment with 4-heptylphenol.
Figure 8B:
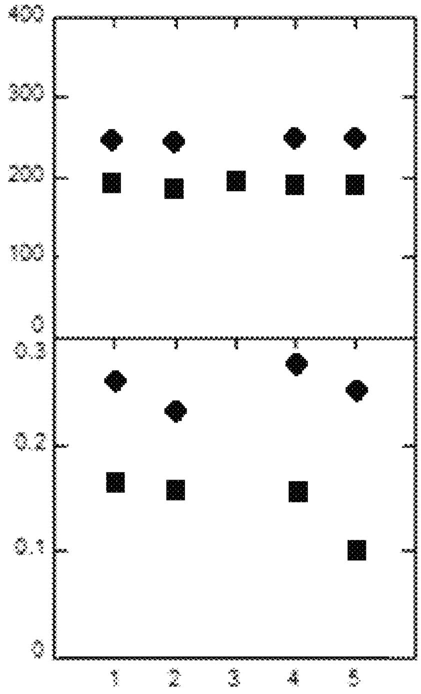

FIGS. 8A and 8B show the results of tests to determine the polydispersity index (PDI) and the ability of the disclosed amphiphilic surfactants to absorb a test substance, 4-heptylphenol. FIG. 8A bottom graph depicts the polydispersity index for the surfactant obtained from Example 3 (■) and Example 5 (♦) in water before treatment with a test compound. FIG. 8B bottom graph depicts the polydispersity index for the surfactant obtained from Example 3 (■) and Example 5 (♦) after treatment with the test compound.

FIG. 8A top graph depicts the intensity-averaged $D_h$ values from multiple dynamic light scattering measurements made on solution comprising the surfactant obtained from Example 3 (■) and Example 5 (♦). FIG. 8B top graph depicts the intensity-averaged $D_h$ values from multiple dynamic light scattering measurements made on solution comprising the surfactant obtained from Example 3 (■) and Example 5 (♦) after treatment with the test compound.

As shown in FIGS. 8A and 8B both amphiphilic surfactants are stable when dispersed in aqueous media and exhibit homogeneous particle distributions. The lower PDI values for the Example 3 amphiphilic surfactant versus Example 5, indicates a better dispersibility and, hence, greater solubility. Regarding loading efficiencies of 4-heptylphenol, indicate the surfactant of Example 3 has a greater capacity for the test compound relative to the surfactant of Example 5. Both surfactants, however, are able to absorb a substantial amount of 4-heptylphenol.

Figure 9:
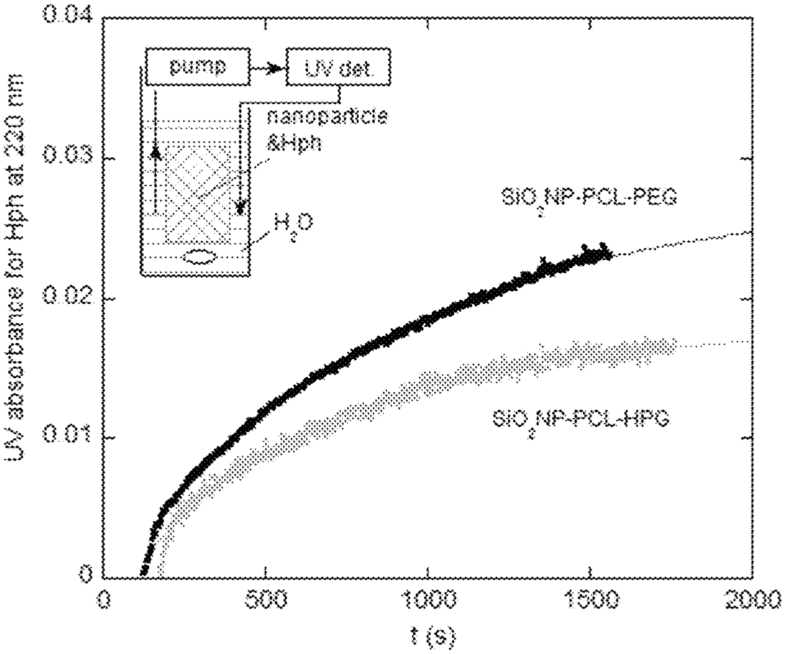
FIG. 9 depicts the monitoring of the release of 4-heptylphenol from the disclosed amphiphilic surfactants.

Because encapsulation capacity is a critical parameters for assessing the utility of the amphiphilic nanoparticles as dispersants, their encapsulation capacity is characterized further demonstrated by the apparatus depicted in the inset of FIG. 9. UV experiments were conducted to compare the encapsulation efficiency of the Example 3 surfactant versus the Example 5 surfactant.

The nanoparticles were dispersed in aqueous solutions containing 4-heptylphenol in concentrations above water solubility. Each mixture was then introduced in a dialysis membrane with a small molecular weight cut-off that would only allow 4-heptylphenol to traverse the membrane but prevent the nanoparticles from leaving the membrane. Finally, the membrane loaded with both nanoparticle and excess dye was immersed in a reservoir containing pure water under mechanical stirring. The ACM technique utilized a series of real-time detectors to provide continuous measurements (e.g. UV absorbance) with respect to time. For this experiment, ACM was used in recirculation mode to monitor the release of the excess, non-encapsulated 4-heptylphenol through the membrane pores by continuously measuring UV absorbance of the aqueous reservoir solution outside the dialysis membrane (see inset to FIG. 9). An HPLC pump circulated sample liquid from aqueous reservoir through an UV detector to acquire real-time data. By circulating the solution in the aqueous reservoir continuously, a continuum of data points was collected which corresponded to the amount of dye released from the nanoparticles.

The graphs shown in FIG. 9 depict the release of free 4-heptylphenol (computed from UV data at 220 nm) through the membrane pores during the dialysis experiments of grafted nanoparticles (1:10 ratio by weight of nanoparticle to 4-heptylphenol). Before the experiment, each sample of dye and nanoparticle (with the same poly(caprolactone) hydrophobic unit but comprising different hydrophilic units) was allowed to sit until each nanoparticle had reached encapsulation equilibrium with 4-heptylphenol. The UV absorbance, due to the free 4-heptylphenol released through dialysis membrane, is higher in the case of the loaded Example 5 surfactant than in the case of the nanoparticles with the Example 3 as hydrophilic layer, indicating that the copolymer grafted nanoparticles with hyperbranched poly(glycerol) have better loading capability or slower release kinetics than those with a linear PEG hydrophilic unit. As such, the formulator can adjust the properties of the resultant amphiphilic surfactants by varying either the hydrophobic or the hydrophilic unit.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. An amphiphilic surfactant, comprising:

i) a nanoparticle core; and ii) a plurality of polymeric units bonded thereto chosen from:

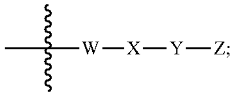

wherein W is an anchoring unit;

X is a hydrophobic unit;

Y is a hydrophilic unit; and

Z is a capping group;

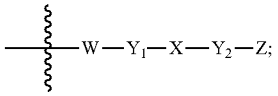

wherein W is an anchoring unit;

$Y_1$ is a first hydrophilic unit;

X is a hydrophobic unit;

$Y_2$ is a second hydrophilic unit; and

Z is a capping group;

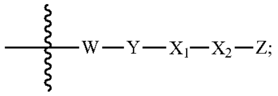

wherein W is an anchoring unit;

$X_1$ is a first hydrophobic unit;

$X_2$ is a second hydrophobic unit distinct from $X_1$;

Y is a hydrophilic unit; and

Z is a capping group; or

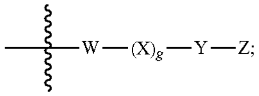

wherein W is an anchoring unit;

X is a hydrophobic unit;

Y is a hydrophilic unit;

Z is a capping group; and g is an integer from 2 to about 10.

2. The surfactant according to claim 1, wherein the nanoparticle core is chosen from silica, silica nanoparticles, functionalized silica, calcium carbonate ($CaCO_3$), carbon hard spheres, barium titanate, calcium carbonate, lactose, porous silica nanoparticles, gold, silver, iron, silicon, aluminum oxide, graphene nanopowder, barium titanate, or barium zirconium titanate and wherein the nanoparticle core has an average diameter of from about 10 nm to about 250 nm.

3. The surfactant according to claim 1, wherein the nanoparticle core is silica or calcium carbonate ($CaCO_3$).

4. The surfactant according to claim 1, wherein the nanoparticle core has an average diameter of from about 10 nm to about 250 nm.

5. The surfactant according to claim 1, wherein the anchoring unit is chosen from (3-glycidoxypropyl)triethoxysilane, n-octyl triethoxysilane, or a mixture thereof.

6. The surfactant according to claim 1, wherein the anchoring units are (3-glycidoxypropyl)-triethoxysilane and n-octyl triethoxysilane and wherein the anchoring units comprise from about 1.25 mol % to about 98.75 mol % of (3-glycidoxypropyl)triethoxy-silane.

7. The surfactant according to claim 1, wherein the hydrophobic unit, X, $X_1$ or $X_2$, is formed from one or more monomers chosen from valerolactone, valerolactam, caprolactone, caprolactam, lactide, and butyrolactone.

8. The surfactant according to claim 1, wherein the hydrophobic unit, X, $X_1$ or $X_2$, comprises caprolactone.

9. The surfactant according to claim 1, wherein the hydrophobic unit, X, $X_1$ or $X_2$, comprises poly(valerolactone), poly(caprolactone), poly(valerolactam), poly(caprolactam), poly(lactide), poly-(butyrolactone), poly(lactic-co-glycolic acid), poly(ethyleneglycol) methyl ether, a hyperbranched poly(glycerol), or mixtures thereof.

10. The surfactant according to claim 1, wherein the hydrophobic unit, X, $X_1$ or $X_2$, comprises poly(caprolactone).

11. The surfactant according to claim 1, wherein the hydrophilic unit is a hyperbranched poly(glycerol) that further comprises crosslinking between one or more other hydrophilic units.

12. The surfactant according to claim 1, wherein the hydrophilic unit has the formula:

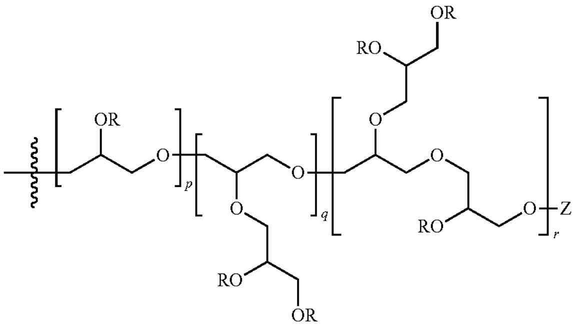

wherein the capping group Z is hydrogen;

each R is independently:

i) hydrogen;

ii) $-CH_2CHOHCH_2OH$; or iii) $-CH_2CHOR^1CH_2OR^1$;

each $R^1$ is independently:

i) hydrogen; or ii) $-CH_2CHOHCH_2OH$;

p is an integer from 1 to 5, q is an integer from 0 to 5 and r is an integer from 0 to 5.

13. The surfactant according to claim 1, wherein the capping group is a unit other than the terminal moiety of a hydrophilic unit or hydrophobic unit.

14. The surfactant according to claim 13, wherein the capping group is chosen from $-(CH_2)_{2-4}CO_2M$, $-(CH_2)_{2-4}OSO_3M$ or $-(CH_2)_{2-4}SO_3M$ wherein M is chosen from sodium, potassium, calcium or ammonium.

15. The surfactant according to claim 1, wherein:

i) W is chosen from (3-glycidoxypropyl)triethoxysilane, n-octyl triethoxysilane, or a mixture thereof;

ii) X, $X_1$ and $X_2$ are each independently chosen from one or more monomers chosen from valerolactone, valerolactam, caprolactone, caprolactam, lactide, butyrolactone or mixtures thereof; or X, $X_1$ and $X_2$ each independently comprises poly(valerolactone), poly(caprolactone), poly(valerolactam), poly(caprolactam), poly(lactide), poly-(butyrolactone), poly(lactic-co-glycolic acid), poly(ethyleneglycol) methyl ether, a hyperbranched poly(glycerol), or mixtures thereof; and iii) Y, $Y_1$ and $Y_2$ are each independently chosen from poly(ethylene glycol), poly(ethylene glycol) methyl ethers each having from 5 to 250 ethyleneoxy units, or a unit having the formula:

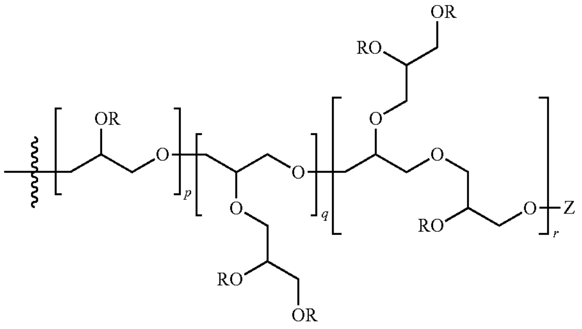

wherein the capping group Z is chosen from —H, $—CH_3$, $—(CH_2)_{2-4}CO_2M$, $—(CH_2)_{2-4}$ $OSO_3M$ or $—(CH_2)_{2-4}SO_3M$ wherein M is a cation chosen from sodium, potassium, calcium or ammonium;

each R is independently:

i) hydrogen;

ii) $—CH_2CHOHCH_2OH$; or iii) $—CH_2CHOR^1CH_2OR^1$;

each $R^1$ is independently:

i) hydrogen; or ii) $—CH_2CHOHCH_2OH$;

p is an integer from 1 to 5, q is an integer from 0 to 5 and r is an integer from 0 to 5.

16. The surfactant according to claim 1, wherein the plurality of polymeric units have the formula:

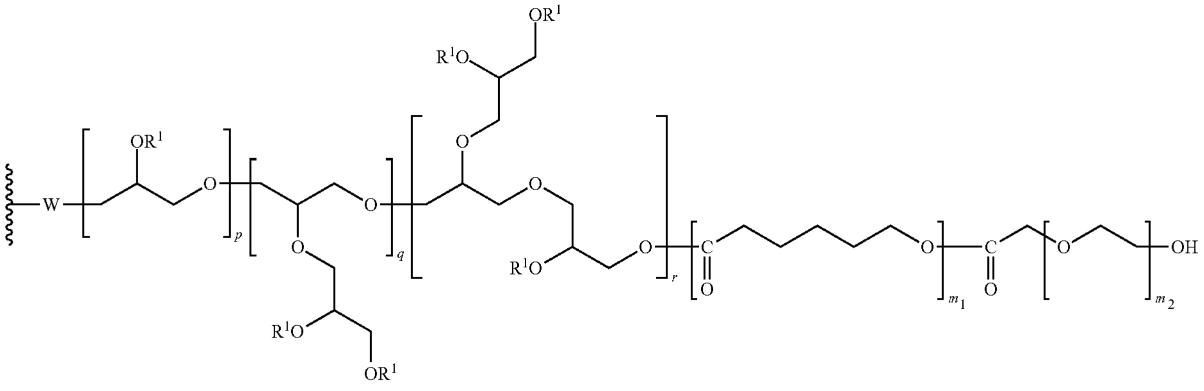

wherein the nanoparticle core is silica;

each $R^1$ unit is hydrogen or a poly(caprolactone) unit having the formula

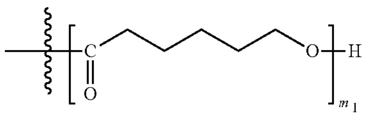

wherein p is an integer from 1 to 5, q is an integer from 1 to 5, r is an integer from 1 to 5; $m_1$ is an integer from about 1 to about 50 and $m_2$ is an integer from about 5 to about 250.

17. The surfactant according to claim 1, wherein the plurality of polymeric units have the formula:

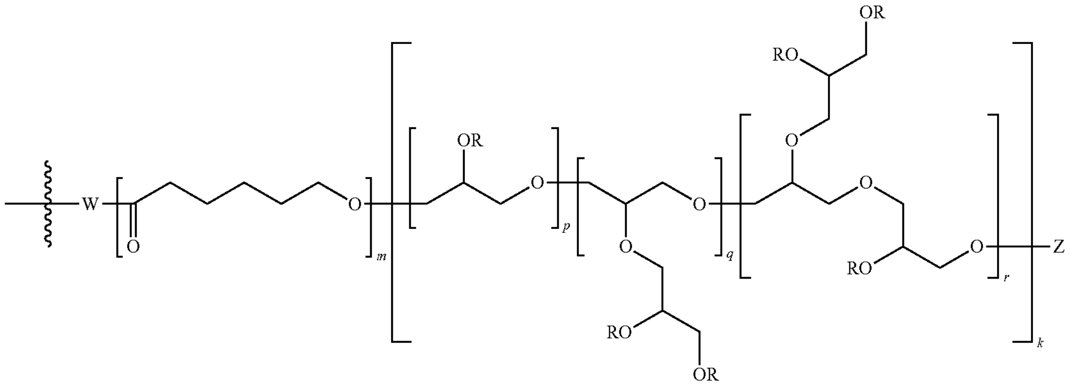

wherein W has the formula:

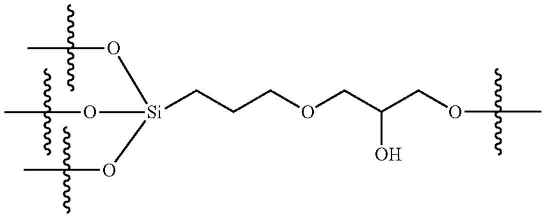

wherein W is bonded to the nanoparticle core;

the capping group Z is hydrogen;

each R is independently:

i) hydrogen;

ii) $—CH_2CHOHCH_2OH$; or iii) $—CH_2CHOR^1CH_2OR^1$;

each $R^1$ is independently:

i) hydrogen; or ii) $—CH_2CHOHCH_2OH$;

m is an integer from 1 to 250, p is an integer from 1 to 5, q is an integer from 0 to 5; and is an integer from 0 to 5; and the nanoparticle core comprises $SiO_2$.

18. The surfactant according to claim 1, wherein the plurality of polymeric units have the formula:

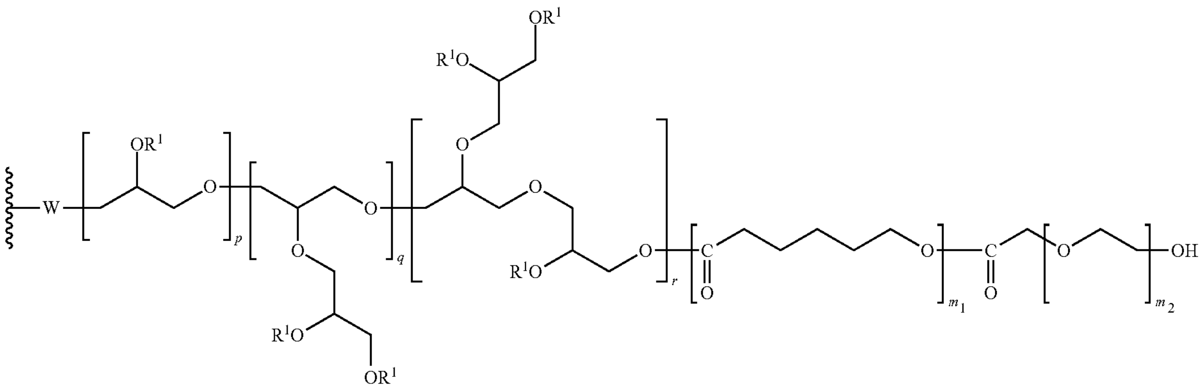
W has the formula:
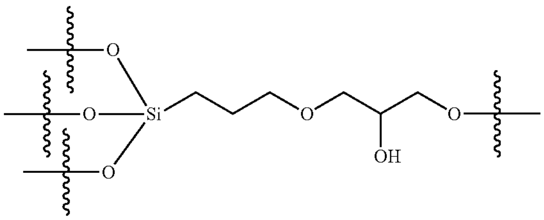
W is bonded to the nanoparticle core and the nanoparticle core is silica;
each $R^1$ unit is hydrogen or a poly(caprolactone) unit having the formula:
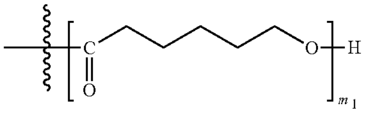
wherein p is an integer from 1 to 5, q is an integer from 1 to 5, r is an integer from 1 to 5;
$m_1$ is an integer from about 1 to about 50 and $m_2$ is an integer from about 5 to about 250.
* * * * *